(12) United States Patent
Piche

(10) Patent No.: US 10,416,619 B2
(45) Date of Patent: Sep. 17, 2019

(54) SYSTEM MODELING, CONTROL AND OPTIMIZATION

(71) Applicant: General Electric Company, Schenectady, NY (US)

(72) Inventor: Stephen William Piche, Austin, TX (US)

(73) Assignee: General Electric Company, Schenectady, NY (US)

( * ) Notice: Subject to any disclaimer, the term of this patent is extended or adjusted under 35 U.S.C. 154(b) by 317 days.

(21) Appl. No.: 15/395,359

(22) Filed: Dec. 30, 2016

(65) Prior Publication Data

US 2018/0024512 A1   Jan. 25, 2018

Related U.S. Application Data

(60) Provisional application No. 62/366,248, filed on Jul. 25, 2016.

(51) Int. Cl.
| | |
|---|---|
| G05B 13/00 | (2006.01) |
| G05B 13/04 | (2006.01) |
| G05B 13/02 | (2006.01) |
| G06N 20/00 | (2019.01) |
| G06N 3/04 | (2006.01) |
| G06N 3/08 | (2006.01) |
| G06F 17/16 | (2006.01) |
| G06N 7/00 | (2006.01) |
| G06F 17/11 | (2006.01) |
| G06F 17/50 | (2006.01) |

(52) U.S. Cl.
CPC ......... *G05B 13/041* (2013.01); *G05B 13/027* (2013.01); *G05B 13/0265* (2013.01); *G06F 17/11* (2013.01); *G06F 17/16* (2013.01); *G06F 17/5009* (2013.01); *G06F 17/5018* (2013.01); *G06N 3/0445* (2013.01); *G06N 3/0472* (2013.01); *G06N 3/08* (2013.01); *G06N 3/084* (2013.01); *G06N 7/005* (2013.01); *G06N 20/00* (2019.01); *G06F 2217/16* (2013.01)

(58) Field of Classification Search
None
See application file for complete search history.

(56) References Cited

U.S. PATENT DOCUMENTS

| | | |
|---|---|---|
| 5,167,009 A | 11/1992 | Skeirik |
| 5,280,756 A | 1/1994 | Labbe |

(Continued)

*Primary Examiner* — Paul B Yanchus, III
(74) *Attorney, Agent, or Firm* — Frank A. Landgraff; Charlotte C. Wilson; James W. Pemrick

(57) ABSTRACT

A method for training a disturbance rejection model that is configured to model an operation of a system so to calculate a predicted value for a system output at a future time. The disturbance rejection model may include a network for mapping system inputs to the system output, the network including a weight vector and a feedback coefficient. The method may include: obtaining a training dataset, and training the disturbance rejection model pursuant to the training dataset. The training may include calculating updated values for each of the weight vector and the feedback coefficient of the network by minimizing an error function that include a first hyperparameter and a second hyperparameter. The first hyperparameter may include a vector for penalizing the weight vector and the second hyperparameter may include a scalar.

24 Claims, 10 Drawing Sheets

(56) References Cited

U.S. PATENT DOCUMENTS

| | | | |
|---|---|---|---|
| 5,386,373 | A | 1/1995 | Keeler et al. |
| 5,408,406 | A * | 4/1995 | Mathur ............ G05B 13/027 700/38 |
| 5,640,493 | A | 6/1997 | Skeirik |
| 6,047,221 | A | 4/2000 | Piche et al. |
| 6,243,696 | B1 | 6/2001 | Keeler et al. |
| 6,381,504 | B1 | 4/2002 | Havener et al. |
| 6,438,430 | B1 | 8/2002 | Martin et al. |
| 6,487,459 | B1 | 11/2002 | Martin et al. |
| 6,493,596 | B1 | 12/2002 | Martin et al. |
| 6,712,604 | B2 | 3/2004 | Havlena |
| 6,725,208 | B1 | 4/2004 | Hartman et al. |
| 6,736,089 | B1 | 5/2004 | Lefebvre et al. |
| 6,985,781 | B2 * | 1/2006 | Keeler ............ G05B 13/027 700/29 |
| 7,123,971 | B2 | 10/2006 | Piche |
| 7,164,954 | B2 | 1/2007 | Lefebvre et al. |
| 7,398,652 | B1 | 7/2008 | Kosvic et al. |
| 7,522,963 | B2 | 4/2009 | Boyden et al. |
| 7,698,004 | B2 | 4/2010 | Boyden et al. |
| 7,844,351 | B2 | 11/2010 | Piche |
| 7,966,080 | B2 | 6/2011 | Jia et al. |
| 8,340,824 | B2 | 12/2012 | James et al. |
| 8,527,072 | B2 | 9/2013 | Piche |
| 8,644,961 | B2 | 2/2014 | Wroblewski et al. |

* cited by examiner

| Variable | Confidence | Confidence > 90% |
|---|---|---|
| MV1 | 99.9 | Yes |
| MV2 | 85.0 | No |
| MV3 | 97.6 | Yes |
| MV4 | 76.7 | No |
| MV5 | 95.3 | Yes |
| MV6 | 98.0 | Yes |

FIG. 9

SYSTEM MODELING, CONTROL AND OPTIMIZATION

CROSS-REFERENCE TO RELATED APPLICATIONS

This application claims priority to U.S. Provisional Patent Application No. 62/366,248 entitled "PROCESS MODELING AND CONTROL USING MODELS WITH CALCULATED CONFIDENCE" filed on Jul. 25, 2016; which provisional application is incorporated herein by reference in its entirety; this application claims the benefit of the provisional's filing date under 35 U.S.C. 119(e).

BACKGROUND OF THE INVENTION

The present invention relates to systems and methods of process or system modeling and control and, specifically, process modeling and control using a calculated confidence in the system model.

In a conventional fossil fuel-fired power plant or generating unit, a fossil fuel/air mixture is ignited in a boiler. Large volumes of water are pumped through tubes inside the boiler, and the intense heat from the burning fuel turns the water in the boiler tubes into high-pressure steam. In an electric power generating application, the high-pressure steam from the boiler passes into a turbine comprised of a plurality of turbine blades. Once the steam hits the turbine blades, it causes the turbine to spin rapidly. The shaft of the spinning turbine is linked to the shaft of a generator, and the rotating shaft within the generator may be used to create an electric potential.

As used herein, the term "power generating plant" refers to one or more power generating units. Each power generating unit may drive one or more turbines used for generating electricity. A power generating unit is typically powered by fossil fuels (including but not limited to, coal, natural gas or oil), and includes a boiler for producing high temperature steam; air pollution control (APC) devices for removal of pollutants from flue gas; a stack for release of flue gas; and a water cooling system for condensing the high temperature steam. A typical power generating unit will be described in detail below in relation to FIG. 1.

As will be appreciated, boiler combustion or other characteristics of a fossil fuel-fired power generating unit are influenced by dynamically varying parameters of the power generating unit, including, but not limited to, air-to-fuel ratios, operating conditions, boiler configuration, slag/soot deposits, load profile, fuel quality and ambient conditions. Changes to the business and regulatory environments have increased the importance of dynamic factors such as fuel variations, performance criteria, emissions control, operating flexibility and market driven objectives (e.g., fuel prices, cost of emissions credits, cost of electricity, etc.).

Further, about one half of the electric power generated in the United States is generated using coal-fired power generating units. Coal-fired power generating units used in power plants typically have an assortment of air pollution control (APC) devices installed for reducing nitrogen oxides (NOx), sulfur oxides (SOx), and particulate emissions. In this regard, selective catalytic reduction (SCR) systems are used for NOx reductions. Spray dry absorbers (SDA) and wet flue gas desulfurization (FGD) systems are used for SOx reductions. Electro-static precipitators (ESPs) and fabric filters (FF) are used for reducing particulate emissions.

Over the past two decades, combustion optimization systems have been implemented for advanced control of the combustion process within the furnace. Typically, combustion optimization systems interface with the distributed control system (DCS) of a power generating unit. Based upon the current operating conditions of the power generating unit, as well as a set of operator specified goals and constraints, the combustion optimization system is used to compute the optimal fuel-to-air staging within the furnace to achieve the desire goals and constraints.

Combustion optimization systems were originally implemented to reduce nitrogen oxides (NOx) produced in the furnace and emitted to the atmosphere via the stack. For example, U.S. Pat. No. 5,280,756 teaches a method and system for controlling and providing guidance in reducing NOx emissions based upon controllable combustion parameters and model calculations while maintaining satisfactory plant performance. U.S. Pat. No. 5,386,373 teaches the use of a predictive model of emissions, including NOx, in conjunction with a control system, while U.S. Pat. No. 6,381,504 describes a method for optimally determining the distribution of air and fuel within a boiler by aggregating the distributions of air and fuel into two common variables, performing an optimization, and then computing the optimal distribution of fuel and air based upon the optimal values of the aggregated variables. U.S. Pat. No. 6,712,604 describes a system for controlling the combustion of fuel and air in a boiler such that the distributions of NOx and CO are maintained to average less than the maximum permitted levels.

In addition, combustion optimization approaches have been used to control boiler parameters in addition to NOx, including unit heat rate, boiler efficiency, and mercury emissions. For example, U.S. Pat. No. 7,398,652 teaches an approach to modeling controllable losses in a power generating unit and a method for optimizing the combustion process based upon these controllable losses. U.S. Pat. No. 8,644,961 teaches a method for reducing mercury emissions from a coal-fired power plant while observing limits on the amount of carbon in the fly ash produced. U.S. Pat. No. 7,522,963 teaches a controller for directing operation of an air pollution control system, such as an FGD or SCR, such that a predefined optimization objective is minimized. Optimization techniques have also been used to control the removal of soot within a boiler. For example, U.S. Pat. No. 6,736,089 teaches a method for removal of soot based upon optimizing a set of boiler performance parameters using a model of the cleanliness factors of heat transfer surfaces. Optimization has also been extended beyond specific components within a power generating unit, such as the boiler, FGD and SCR. As provided in U.S. Pat. No. 7,844,351, which is hereby incorporated herein in its entirety, an approach to optimization of multiple components, within a single power generating unit or multiple power generating units, is described.

Neural networks have been used to both predict and optimize industrial systems. For example, U.S. Pat. No. 5,167,009 teaches a method for predicting output data of a process using a neural network and subsequently using the prediction in a control or optimization system. As another example, U.S. Pat. No. 7,123,971 teaches an approach to training neural network models to predict the change in the output based upon the change in the inputs. Using this approach, referred to as disturbance rejection based training, the model is trained to learn the cause of the change in an output rather than simply learning the correlation structure of the data which results in a significant improvement in optimization results. In addition, U.S. Pat. No. 6,725,208 teaches the use of a Bayesian training technique of combining multiple weighted neural network models to form a model used in optimization of a process. This type of model can be used to estimate the uncertainty in the predicted output, though these capabilities are limited.

Thus, the prior art describes methods and systems for using models, including neural network models, to optimize industrial systems and processes. In addition, disturbance rejection based training has been found to provide more accurate neural network models for use in process optimization. The prior art, however, does not describe a disturbance rejection based neural network training method for predicting change in the output due to change in the inputs along with an estimate of the uncertainty in the predicted change in the output nor does it describe how such a neural network model could be used to improve optimization. The present invention provides systems and methods that overcome the abovementioned shortcomings of the prior art, and provide advantages over conventional approaches to control and optimization industries such as power generation.

BRIEF DESCRIPTION OF THE INVENTION

The present application thus describes a method or system for training a disturbance rejection model that is configured to model an operation of a system so to calculate a predicted value for a system output at a future time. The disturbance rejection model may include a network for mapping system inputs to the system output, the network including a weight vector and a feedback coefficient. The method may include the steps of: obtaining a training dataset, the training dataset including a time series dataset of actual values for the system inputs and the system output as determined from measurements taken of the operation of the system during a historical operating period and training the disturbance rejection model pursuant to the training dataset. The training may include calculating updated values for each of the weight vector and the feedback coefficient of the network by minimizing an error function that include a first hyperparameter and a second hyperparameter. The first hyperparameter may include a vector for penalizing the weight vector and the second hyperparameter may include a scalar.

These and other features of the present application will become apparent upon review of the following detailed description of the preferred embodiments when taken in conjunction with the drawings and the appended claims.

BRIEF DESCRIPTION OF THE DRAWINGS

These and other features of this invention will be more completely understood and appreciated by careful study of the following more detailed description of exemplary embodiments of the invention taken in conjunction with the accompanying drawings, in which:

FIG. 9 shows a table comparing the results of the confidence calculation may be compared to a threshold for determining whither additional data needs collection in accordance with embodiments of the present invention.

DETAILED DESCRIPTION OF THE INVENTION

Figure 1:
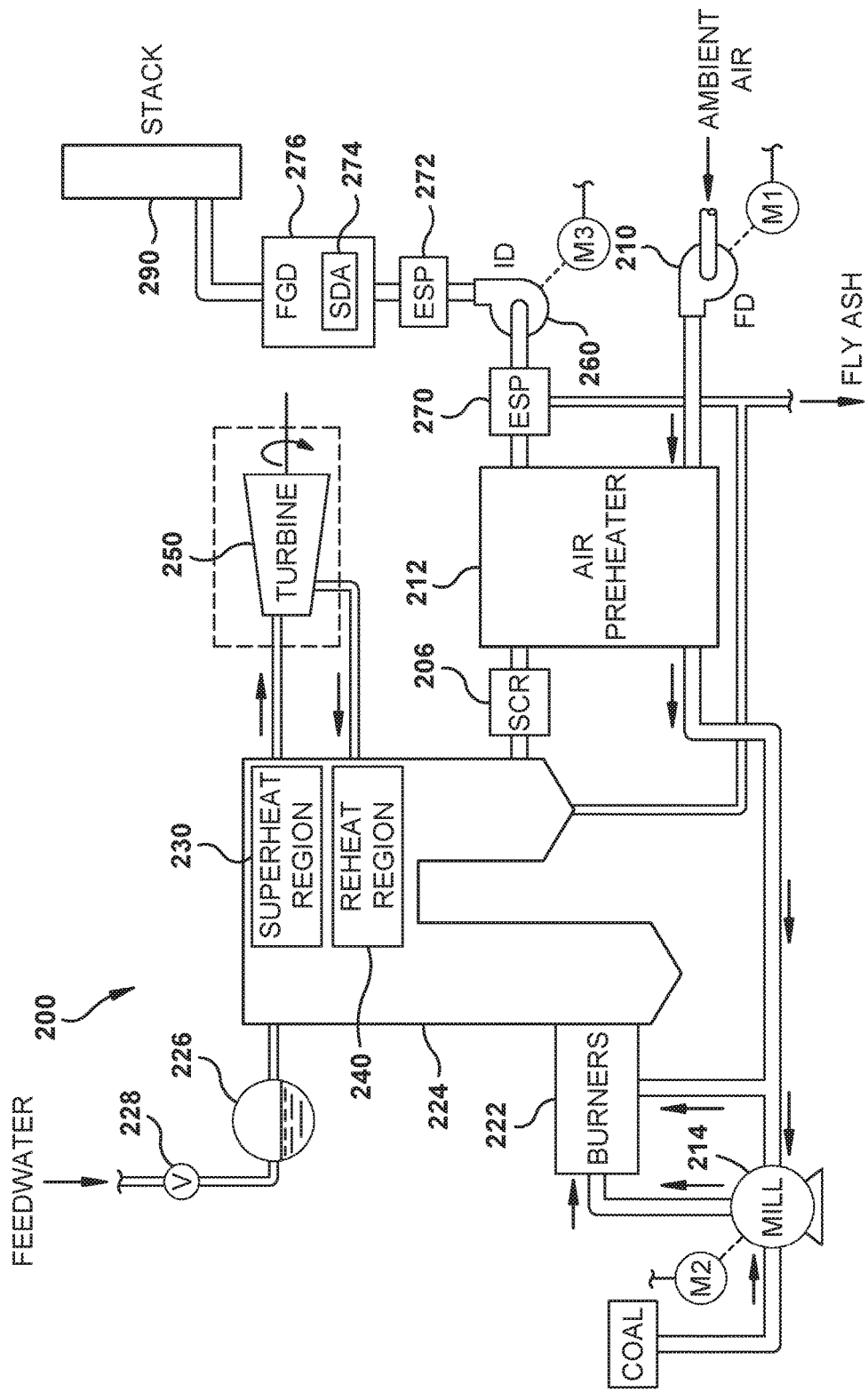
FIG. 1 shows a schematic representation of the primary components of a conventional fossil fuel power generating unit.

The main components of a typical fossil fuel power generating unit 200 will now be described with reference to FIG. 1. As illustrated, power generating unit 200 includes one or more forced draft (FD) fans 210 that are powered by motors M1. Forced draft fans 210 supply air to mills 214 and to burners 222, via an air preheater 212. Ambient air is heated as it passes through air preheater 212. Mills 214 include pulverizers that are powered by motors M2. The pulverizers grind coal (or other fuel) into small particles (i.e., powder). The air received by the mills from forced draft fans 210 is used to dry and carry the coal particles to burners 222. Air from forced draft fans 210 that is supplied to burners 222, via air preheater 212, facilitates combustion of the coal at furnace 224. Hot flue gas is drawn out of furnace 224 by one or more induced draft (ID) fans 260, and delivered to the atmosphere though a chimney or stack 290. Induced draft fans 260 are powered by motors M3. Water is supplied to a drum 226 by control of a feedwater valve 228. The water in drum 226 is heated by furnace 224 to produce steam. This steam is further heated in a superheat region 230 by a superheater (not shown). A superheater spray unit (not shown) can introduce a small amount of water to control the temperature of the superheated steam. A temperature sensor (not shown) provides a signal indicative of the sensed temperature of the superheated steam. Superheated steam produced by power generating unit 200 is supplied to a turbine 250 that is used to produce electricity. Steam received by the turbine is reused by circulating the steam through a reheater (not shown) that reheats the steam in a reheat region 240. A reheater spray unit (not shown) can introduce a small amount of water to control the temperature of the reheated steam. A temperature sensor (not shown) provides a signal indicative of the sensed temperature of the reheated steam.

A "boiler" includes, but is not limited to, burners 222, furnace 224, drum 226, superheater, superheater spray unit, reheater, reheater spray unit, mills 214, and a boiler economizer (not shown). The boiler economizer recovers "waste heat" from the boiler's hot stack gas and transfers this heat to the boiler's feedwater.

Soot cleaning devices (not shown), include, but are not limited to, sootblowers, water lances, and water cannons or hydro-jets. Soot cleaning devices use steam, water or air to dislodge deposits, such as slag, and clean surfaces throughout various locations in the boiler. Soot cleaning is required to maintain performance and efficiency of power generating unit 200. The number of soot cleaning devices on a given power generating unit can range from several to over a hundred. Furthermore, the soot cleaning devices may be grouped together by location (e.g., zones in the boiler). Each group of soot cleaning devices may be comprised of one or more soot cleaning devices. For example, a boiler may have eight soot cleaning device groups, each group including five individual soot cleaning devices.

In addition, power generating unit 200 includes some form of post-combustion air pollution control (APC) equipment for removing pollutants from the flue gas. The APC equipment may include, but is not limited to, a selective catalytic reactor (SCR) 206, an electro-static precipitator (ESP) 270, a fabric filter (FF) 272, a spray dry absorber (SDA) 274, and a wet flue gas desulfurization (FGD) system 276.

A selective catalytic reactor (SCR) is used to remove nitrogen oxides (NOx) from the flue gas. Dirty flue gas leaves the boiler and enters the selective catalytic reduction (SCR) system. Prior to entering the SCR, NOx in the inlet flue gas is measured with one or more analyzers. In addition, prior to entering the SCR, the flue gas passes through an ammonia ($NH_3$) injection grid (not shown) located in the ductwork. Ammonia that has been mixed with dilution air is dosed into the flue gas by the injection grid. The NOx laden flue gas, ammonia and dilution air pass into the SCR reactor and over the SCR catalyst. The SCR catalyst promotes the reduction of NOx with ammonia to nitrogen and water. NOx "free" flue gas leaves the SCR reactor and exits the power generating unit via potentially other APC subsystems and the stack.

Additional NOx analyzers are located in the NOx "free" flue gas stream exiting the SCR system or in the stack. The measured NOx outlet value and the measured NOx inlet value are used to calculate a NOx removal efficiency. NOx removal efficiency is defined as the percentage of inlet NOx removed from the flue gas.

In addition, a small amount of unreacted ammonia (i.e., "ammonia slip") is exhausted from the SCR. This ammonia slip can react with other components of the flue gas to form salts that can be deposited, and subsequently foul other system components, such as the air preheater. Thus, to prevent fouling of components, the level of ammonia slip is often constrained.

As the amount of ammonia injected into the flue gas increases, the removal efficiency improves while the ammonia slip increases. Thus, a constraint on ammonia slip indirectly constrains the removal efficiency of the SCR. Because ammonia slip is often not directly measured on-line in real-time, it is typically indirectly controlled by limiting the removal efficiency of the SCR.

An electro-static precipitator (ESP) is the most common approach to removal of particulate matter from the flue gas steam of a power generating unit. In an ESP, particles suspended in the flue gas are electrically charged. An electric field then forces the charged particles to an electrode where they are collected. A rapping system is used to remove the particles from the electrode. The removed particles fall into an ash handle system which is used to dispose of the ash. Using this approach, ESPs can typically achieve 90%-99.5% removal rates of particulate matter.

An ESP is typically comprised of a series of electrical plates with wires between the plates. The wires are used to charge the particles using corona discharge. An electric field for driving the particles is established between the wire and plates. The flue gas flows through a series of electrically separated fields of plates and wires. Each of these fields may be separately powered. The primary motivation for using separate fields is to provide redundancy in the system.

A wet flue gas desulfurization (FGD) is the most common approach to removal of significant amounts of $SO_2$ from the flue gas of power generating units. In a power generating unit, dirty, $SO_2$ laden flue gas is exhausted from a boiler. The $SO_2$ laden flue gas is input into an absorber tower, which is the primary component in an FGD.

The $SO_2$ in the flue gas has a high acid concentration. Accordingly, the absorber tower operates to place the $SO_2$ laden flue gas in contact with a liquid slurry having a higher pH level than that of the flue gas. This is accomplished by spraying the liquid slurry in countercurrent to the flue gas in the absorber tower.

During processing in the countercurrent absorber tower, the $SO_2$ in the flue gas will react with a calcium carbonate-rich slurry (limestone and water) to form calcium sulfite, which is basically a salt and thereby removing the $SO_2$ from the flue gas. The spray, including the $SO_2$ in the form of calcium sulfite, falls into a large tank at the bottom of the absorber. The $SO_2$-cleaned flue gas is exhausted from the absorber tower, either to an exhaust stack or to downstream processing equipment. A blower pressurizes ambient air to create oxidation air within the absorber tank. The oxidation air is mixed with the slurry in the tank to oxidize the calcium sulfite to calcium sulfate. Each molecule of calcium sulfate binds with two molecules of water to form a compound that is commonly referred to as gypsum. The gypsum is removed from the wet FGD processing unit and sold to, for example, manufacturers of construction grade wallboard. In order to sell the gypsum, it must be of an acceptable purity. The purity is affected by the pH which also affects the removal efficiency.

In FIG. 1, coal is used as the fuel for power generating unit 200. In general, fossil fuel power generating units often use a blend of multiple fuels. For example, most operators of coal-fired power generating units combine various types of coals to achieve a desired blend that is burned in the furnace. Typically, several different types of coal are stocked in the coal yard at a power generating plant. These different coals may come from the same mine or from a variety of mines. If these coals are from the same mine, they may come from different seams or different locations in the mine. Thus, each of the coals at the power generating plant may have different costs, availability, and coal characteristics including heat, sulfur, nitrogen and ash content. Typically, the different coals are blended together by an operator often using "rules of thumb" to supply the furnace with a desired blend of coal. In addition, fuel additives may be introduced into the blend to improve heat rate or provide desired fuel characteristics.

It should be apparent that a typical power generating unit also includes additional components well known to those skilled in the art, including, but not limited to, tubes for carrying fluids, valves, dampers, windbox, sensing devices for sensing a wide variety of system parameters (e.g., temperature, pressure, flow rate, and flue gas components), and actuators for actuating components such as valves and dampers.

Figure 2:
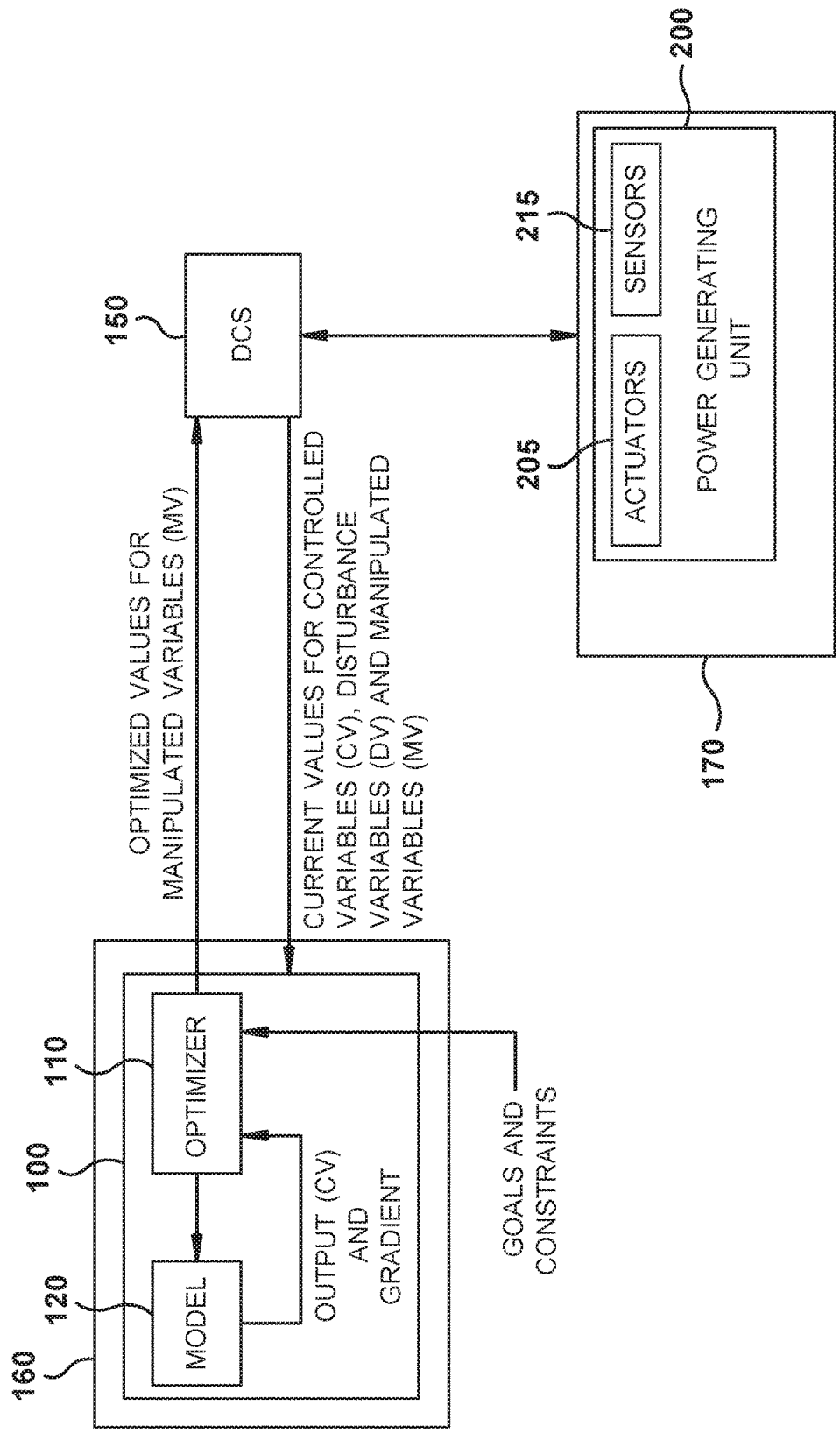
FIG. 2 illustrates a block diagram of an optimization system having aspects in accordance with exemplary embodiments of the present invention.

FIG. 2 illustrates a block diagram of an optimization system 100. In the illustrated embodiment, optimization system 100 is comprised of an optimizer 110 and a model 120. Optimizer 110 and model 120 are both described in greater detail below. In accordance with an illustrated embodiment, optimization system 100 may form part of a supervisory controller 160 that communicates with a DCS 150. DCS 150 may be a computer-based control system that provides regulatory control of a power generating plant 170. DCS 150 may take the form of a programmable logic controller (PLC). Supervisory controller 160 is a computer system that provides supervisory control data to DCS 150. It should be understood that in an alternative embodiment, model 120 may reside on a different computer system than optimizer 110. An operator interface (not shown) may provide means for an operator to communicate with DCS 150. DCS 150 may also communicate with a historian (not shown).

Plant 170 may include one or more power generating units 200. Each power generating unit 200 may include a plurality of actuators 205 and sensors 215. Actuators 205 may include devices for actuating components such as valves and dampers. Sensors 215 may include devices for sensing various system parameters (e.g., temperature, pressure, flow rate, and flue gas components).

As will be appreciated, model 120 is used to represent the relationship between (a) manipulated variables (also "MV") and disturbance variables (also "DV") and (b) controlled variables (also "CV"). Manipulated variables (MVs) represent those variables that may be changed by the operator or optimization system 100 to affect the controlled variables. The MVs typically include a subset of the following variables: over-fired air damper position, tilt and yaw biases, secondary air damper position biases, fuel mill speed biases, primary air biases, O2 bias, master burner tilt, windbox to furnace bias and other variables in the boiler that may affect the CVs. As used herein, disturbance variables refer to variables (associated with power generating unit 200) that affect the controlled variables, but cannot be manipulated or controlled by an operator (e.g., ambient conditions, characteristics of the coal, load, etc.). As will be appreciated, optimizer 110 may function by determining an optimal set of setpoint values for the manipulated variables given (1) a desired goal associated with operation of the power generating unit (e.g., minimizing NOx production) and (2) constraints associated with operation of the power generating unit (e.g., limits on emissions of NOx, $SO_2$, $CO_2$, CO, mercury, ammonia slip and particulate matter).

At a predetermined frequency, optimization system 100 may obtain the current values of manipulated variables, controlled variables and disturbance variables from DCS 150. An "optimization cycle" commences each time the current values for the manipulated variables, controlled variables and disturbance variables are read out from DCS 150. As will be described in further detail below, optimization system 100 may use model 120 to determine an optimal set of setpoint values for the manipulated variables based upon current conditions of power generating unit 200. The optimal set of setpoint values may then be sent to DCS 150. An operator of plant 170 has the option of using the optimal set of setpoint values for the manipulated variables. In most cases, the operator allows the computed optimal set of setpoint values for the manipulated variables to be used as setpoints values for control loops. Optimization system 100 runs in a closed loop adjusting the setpoints values of the manipulated variables at a predetermined frequency (e.g., as frequently as every 10 seconds or as infrequently as every half hour) depending upon current operating conditions of power generating unit 200.

Probabilistic Neural Network with Disturbance Rejection

The model of 120 may be developed based upon 1) known first principle equations describing the system, 2) data, resulting in an empirical model, or 3) a combination of known first principle equations and data. In developing models for NOx and CO in a power plant, the first principles equations are not easily derived—computational fluid dynamics must be used. For this reason, it is preferred to build empirical model based upon data collected from the plant. Furthermore, since the MVs may have been kept constant in the past or moved to control the unit, it is typical necessary to perform a "Design of Experiments" to collect the data required to build an empirical model.

Figure 3:
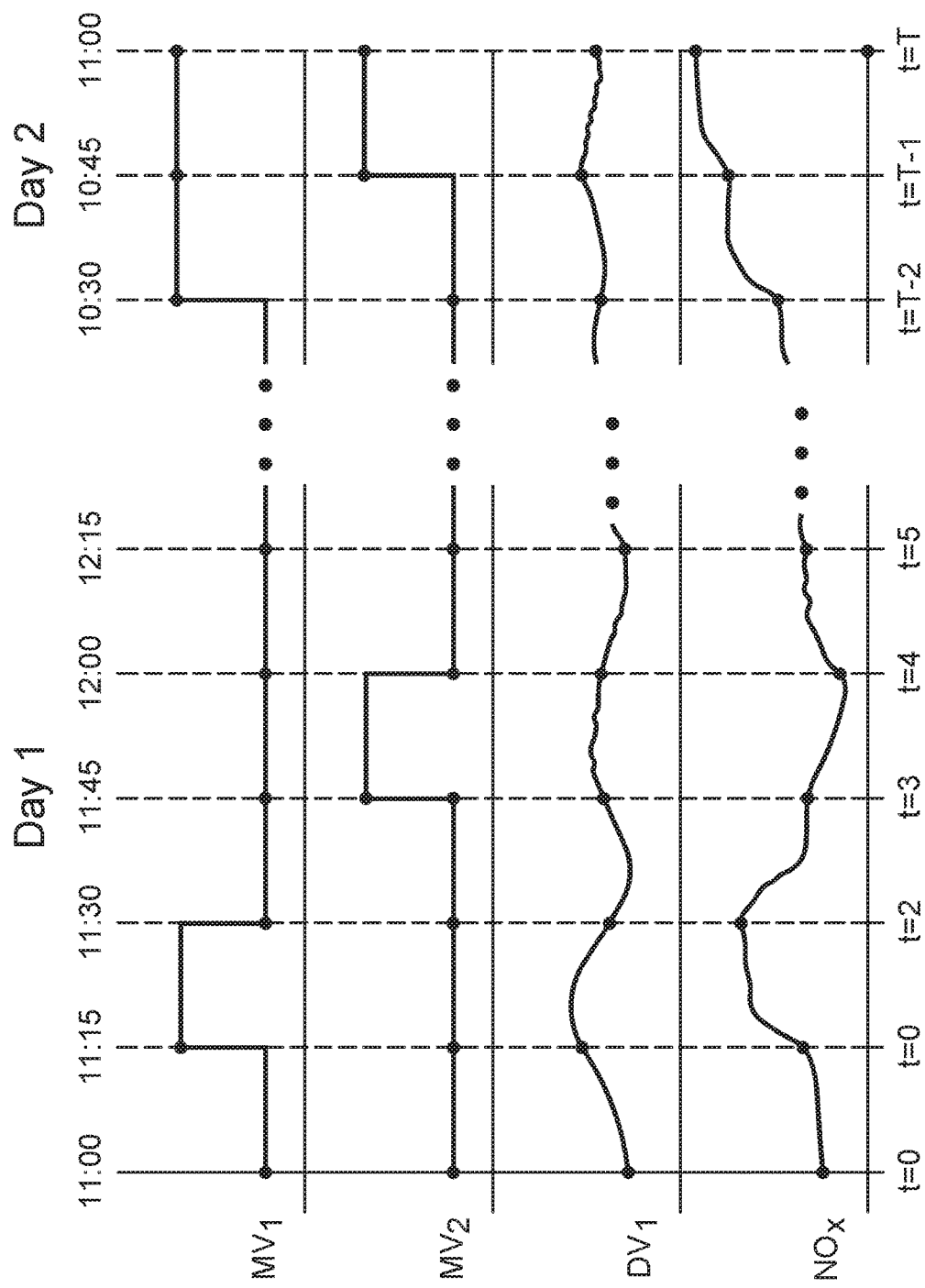
FIG. 3 shows an example of the results of a "Design of Experiments" for collecting data for training a model.

FIG. 3 shows an example of the results of a Design of Experiments for collecting data for training a model. As shown, a time-series plot of two MVs, a DV, and a CV of interest (for example, NOx) are shown. $MV_1$, for example, may represent an upper separated over-fired air damper bias position while $MV_2$, for example, may represent a lower separated over-fired air damper bias position. The DV, for example, may represent the mega-watt load of the generator. In this illustration, it will be appreciated that, while only 2 MVs, 1 DV and 1 CV are shown, data is typically collected for many MVs, DVs, and CVs when performing a Design of Experiments collection of data. As further shown, the sampling time of the data is shown at the top of the plot. In this case, sampling starts at 11:00 am on Day 1 and concludes at 11:00 am on Day 2, with samples being collected every fifteen minutes. The first sample is labeled time t=0, the second is labeled time t=1, etc., up to the last point of time t=T.

To perform an appropriate Design of Experiments, the MVs may be moved independently such that the moves are uncorrelated over time. It will be appreciated that the goal of the Design of Experiments is to collect sufficient data to develop the model, which then can be used for optimization. As shown in FIG. 3, at each sampling time, the MVs are moved (if they are to be moved for the sample period). After the sample time, the MVs are held constant until the next sampling time. In this case, the interest is in building a steady state model and, thus, the sampling time is sufficient to allow the process to come to steady state. Thus, for example, because a move in a damper position bias takes approximately 15 minutes for its full effect to be realized, the sampling time is set accordingly. In the present application, the focus is primarily on steady state models. It should be appreciated, though, that present systems and methods may be extended to dynamic models. As shown in FIG. 3, the effects of moving $MV_1$ and holding it steady from time (t=1) to just prior to time (t=2) influences the NOx at time (t=2).

Figure 4:
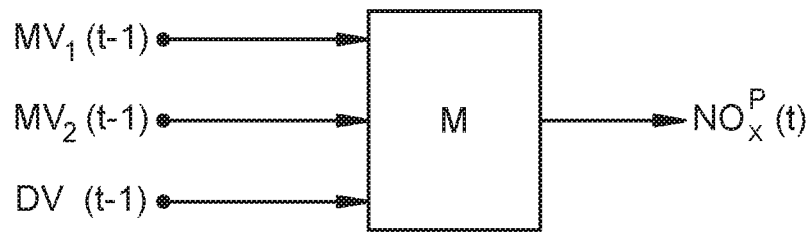
FIG. 4 illustrates an exemplary schematic diagram of an empirical model.

The sampled points shown in FIG. 3 of the MVs, DV and NOx then may be used to create a dataset for training an empirical model, such as the model shown in FIG. 4. As illustrated, the model in FIG. 4 (represented by the box M) has three inputs: $MV_1(t-1)$, $MV_2(t-1)$ and $DV(t-1)$. As will be appreciated, these inputs are used to predict the output NOx(t). That is, the inputs, the two MVs and DVs at time (t−1) are used to predict the NOx at time (t), $NO_x^P(t)$. To properly capture the relationship between the manipulated/disturbance variables and the controlled variables, the model in FIG. 4 may need to be nonlinear. This is because nonlinear models can represent curved rather than straight-line relationships between manipulated/disturbance variables and controlled variables, which are common to complex systems such as those discussed herein. For example, a nonlinear, curved relationship is typically observed between over-fire air dampers and NOx levels. Given the foregoing requirements, a neural network based approach is presently a preferred embodiment for implementing models in accordance with the present invention. Neural networks are developed based upon empirical data using advanced regression algorithms. See, for example, C. Bishop, *Pattern Recognition and Machine Learning*, Springer, New York, N.Y., 2006, fully incorporated herein by reference. Neural networks are capable of capturing the nonlinearity commonly exhibited by boilers and other power generating systems.

As will be further appreciated, the model of FIG. 4 is independent of the current reading of NOx at time (t-1). Hence, it does not take advantage of the most current reading of NOx at time (t-1) to predict the NOx at time (t). As described in U.S. Pat. No. 7,123,971, which is incorporated herein by reference in its entirety, using the value of NOx at time (t-1) may be used to significantly improve the accuracy of the model.

Figure 5:
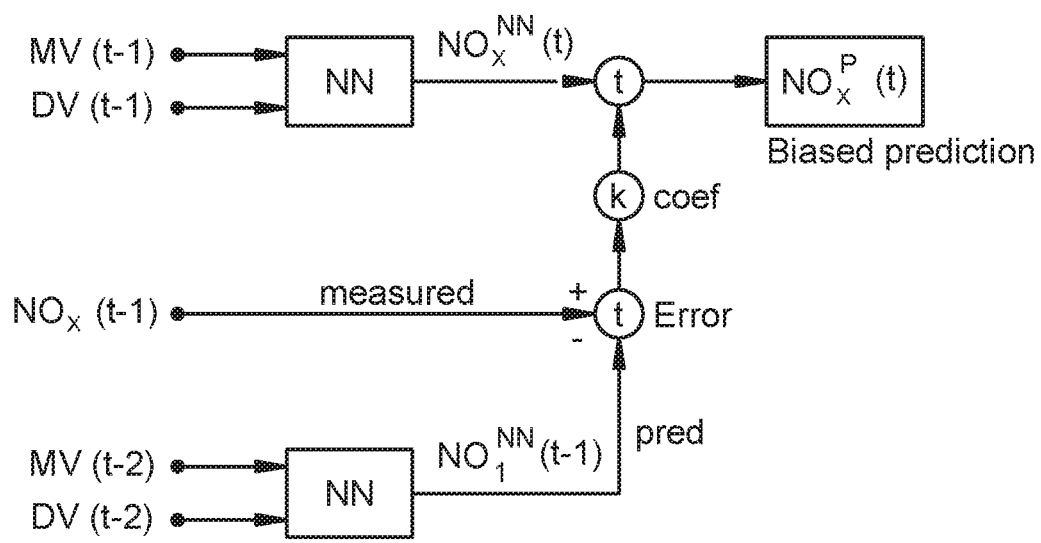
FIG. 5 shows a disturbance rejection model in accordance with aspects of exemplary embodiments of the present invention.

FIG. 5 shows a disturbance rejection type model, which was described in U.S. Pat. No. 7,123,971. As shown, a neural network model (NN) is used to predict the NOx at time (t-1) using the MVs and DVs at time (t-2). The difference between the prediction of the NOx at time (t-1) and the actual value of the NOx at time (t-1) are multiplied by a feedback coefficient (k) and then added to the prediction of NOx from the neural network at time (t). If the feedback coefficient is about 1, it will be appreciated that the prediction at time (t) is biased by the error in the prediction at time (t-1).

The model of FIG. 5 has shown usefulness for optimization processes. In optimization, the interest is in minimizing the NOx at time (t+1) by determining a set of values for the MVs at time (t). The error in the model at the current time is known and can be used to bias the prediction at time (t+1). As described in detail in U.S. Pat. No. 7,123,971, this approach allows the rejection of slowly varying unmeasured disturbance in the model prediction. Using the training method given in U.S. Pat. No. 7,123,971, more accurate models for optimization can be determined. For this reason, the model of FIG. 5 is a preferred neural network embodiment.

U.S. Pat. No. 6,725,208, which is incorporated herein by reference in its entirety, introduces the use of a probabilistic model for use in an optimization system. A probabilistic model may be provided that is based upon Bayesian techniques for the model "M" shown in FIG. 4. This probabilistic model is based upon a Bayesian sampling approach and, thus, uses a committee of neural networks. As will be appreciated, the final prediction is based upon a weighted average of the committee of neural networks. In accordance with the present invention, an alternative approach to developing a probabilistic model is based upon the Bayesian evidence approximation, which allows development of a probabilistic model without sampling and, thus, allows the use of a single neural network model in the probabilistic formulation. Accordingly, in the present application, a probabilistic model is developed using Bayesian techniques for the model shown in FIG. 5. This probabilistic model may be developed without sampling. According to certain embodiments, it is shown how this model may be trained. In addition, the present application shows how the quality of the model can be computed using a confidence metric. This confidence metric may then be used to determine whether additional data is required for training the model and what that additional data is. Also, it is shown how the probabilistic model can practically be used in an optimization to compute a set of MVs that can be used to control an industrial system, such as the plant of FIG. 1.

Training Algorithm for Probabilistic Neural Networks with Disturbance Rejection

In this section, a training algorithm for probabilistic neural networks with disturbance rejection will be discuss that accords with exemplary embodiments of the present invention. First, with reference to U.S. Pat. No. 7,123,971, a review of a training algorithm for deterministic neural networks with disturbance rejection is provided. Following that, an algorithm for the calculation of the second derivative of an error function with respect to the weights is provided. Then, the Bayesian approach to the neural network model in FIG. 5 is derived, and an approach to Bayesian hyperparameter re-estimation is shown that is in accordance with the present invention. In the final section of this part of the application, a review is provided of an exemplary training algorithm for the probabilistic neural network with disturbance rejection that accords with the present invention.

The disturbance rejection algorithm, which may be used to train the neural network model in FIG. 5, will now be discussed. It is described in full detail in U.S. Pat. No. 7,123,971, which is incorporated herein by reference in its entirety. First, the model to be trained is defined using the disturbance rejection algorithm along with a training dataset. As shown in FIG. 3, the training dataset may be generated via collecting data from time 0 to T for the correlated MVs, DVs and CVs of the system. The MVs and DVs at time (t) may be combined into a generic input vector, $x_t = [x_{t,1}\ x_{t,2}\ \ldots\ x_{t,X}]^T$, where X is the number of inputs. For convenience and without loss of generality, a model with a single output or CV is used for the purposes of this example. The sampled data for the output of interest at time (t), which may be a CV such a NOx, is represented by the scalar $d_t$. Thus, an exemplary neural network model at time (t) and weights w may be defined as:

$$m_t = NN(x_{t-1}, w) \qquad \text{Equation 1}$$

where $m=[m_1\ m_2\ \ldots\ m_t\ \ldots\ m_T]^T$ refers to the predicted output vector from the model. The predicted output at time (t), $y_t$, may be defined as:

$$y_t = m_t + k(d_{t-1} - m_{t-1}) \qquad \text{Equation 2}$$

The vector $y=[y_1\ y_2\ \ldots\ y_t\ \ldots\ y_T]^T$ is the predicted output over the dataset. Using a neural network as the model results in the following equation representing the model shown in FIG. 5:

$$y_t = NN(x_{t-1}, w) + k(d_{t-1} - NN(x_{t-2}, w)) \qquad \text{Equation 3}$$

Accordingly, as used herein, the following definitions are provided:

$x_t$ is the input vector in the historical dataset, comprised of the MVs and DVs;

$d_t$ is the output in the historical dataset;

$d=[d_1\ d_2\ \ldots\ d_t\ \ldots\ d_T]^T$ is a vector contain all outputs in the historical dataset;

$m_t$ is the predicted output from the models;

$m=[m_1\ m_2\ \ldots\ m\ \ldots\ m_T]^T$ is the predicted output vector from the models;

$NN(x_t, w)$ is a neural network prediction at time (t) given a set of weights; and w is the weight vector of a neural network.

To find the weight vector w of the neural network, the following error function may be minimized:

$$E = \frac{1}{2}\alpha w^T w + \frac{1}{2}\sum_{t=3}^{T}(y_t - d_t)^2 \qquad \text{Equation 4}$$

where the hyperparameter α is a penalty on the size of the weights in the weight vector w.

Alternatively, using:

$$\epsilon_t = y_t - d_t \qquad \text{Equation 5}$$

the error function can be written as:

$$E = \frac{1}{2}\alpha w^T w + \frac{1}{2}\sum_{t=2}^{T}\epsilon_t^2 \qquad \text{Equation 6}$$

The Disturbance Rejection Algorithm

Given the definitions above, the disturbance rejection algorithm of U.S. Pat. No. 7,123,971 is provided below. As will be appreciated, this algorithm is based on a gradient descent approach or a modified version of backpropagation. With reference again to U.S. Pat. No. 7,123,971, the disturbance rejection algorithm may include the following steps and may be employed to update the weights of the model at each training iteration:

i) Forward Iteration of the Model: A forward propagation of the model across the time series, from (t=2) to (t=T) is performed using the following equation:

$$y_t = NN(x_{t-1}, w) + k(d_{t-1} - NN(x_{t-2}, w)) \qquad \text{Equation 7}$$

ii) Modified Backpropagation: The derivative of the error with respect to the weights and feedback coefficient are computed using:

$$\frac{\partial E}{\partial w} = \alpha w + \sum_{t=2}^{T}(\epsilon_t - k\epsilon_{t+1})\frac{\partial NN(x_{t-1}, w)}{\partial w} \qquad \text{Equation 8}$$

$$\frac{\partial E}{\partial k} = \sum_{t=2}^{T} -\epsilon_t \epsilon'_{t-1} \qquad \text{Equation 9}$$

$$\epsilon_t = y_t - d_t \qquad \text{Equation 10}$$

$$\epsilon'_t = NN(x_t, w) - d_t \qquad \text{Equation 11}$$

Where $\epsilon_{T+1} = \epsilon_1 = 0$. The derivative of the error with respect to the weights can be implemented by back-propagating $\epsilon_t - k\epsilon_{t+1}$ through the network at each time interval from 2 to T−1. At time T, $\epsilon_t$, is back-propagated through the network while at time 1, $-k\epsilon_2$, is backpropagated.

iii) Model Parameter Update: The weights may then be updated using steepest descent or other gradient based weight learning algorithms. To guarantee stability of the time series model, it generally is advisable to constrain the feedback coefficient, k, to a value of less than 1.0 and greater than 0.0.

Matrix Version of the Disturbance Rejection Algorithm

For convenience in deriving the second derivative of the disturbance rejection model in FIG. 5, a matrix version of the disturbance rejection algorithm may be used, as provided below. To define the matrix of the disturbance rejection algorithm, the following T×T matrices (T is the number of samples in the dataset) may be needed:

$$C = \begin{bmatrix} 0 & 0 & 0 & & 0 & 0 & 0 \\ 0 & 1 & 0 & \cdots & 0 & 0 & 0 \\ 0 & 0 & 1 & & 0 & 0 & 0 \\ \vdots & & & \ddots & & & \vdots \\ 0 & 0 & 0 & & 1 & 0 & 0 \\ 0 & 0 & 0 & \cdots & 0 & 1 & 0 \\ 0 & 0 & 0 & & 0 & 0 & 1 \end{bmatrix} \qquad \text{Equation 12}$$

$$K = \begin{bmatrix} 0 & 0 & 0 & & 0 & 0 & 0 \\ k & 0 & 0 & \cdots & 0 & 0 & 0 \\ 0 & k & 0 & & 0 & 0 & 0 \\ \vdots & & & \ddots & & & \vdots \\ 0 & 0 & 0 & & 0 & 0 & 0 \\ 0 & 0 & 0 & \cdots & k & 0 & 0 \\ 0 & 0 & 0 & & 0 & k & 0 \end{bmatrix} \qquad \text{Equation 13}$$

$$S = \begin{bmatrix} 0 & 0 & 0 & & 0 & 0 & 0 \\ 1 & 0 & 0 & \cdots & 0 & 0 & 0 \\ 0 & 1 & 0 & & 0 & 0 & 0 \\ \vdots & & & \ddots & & & \vdots \\ 0 & 0 & 0 & & 0 & 0 & 0 \\ 0 & 0 & 0 & \cdots & 1 & 0 & 0 \\ 0 & 0 & 0 & & 0 & 1 & 0 \end{bmatrix} \qquad \text{Equation 14}$$

It should be noted that these matrices may be implemented using sparse matrices methods to allow efficient storage and calculation with them. Using these definitions of C and K, the forward propagation equation of the disturbance rejection algorithm, Equation 7, can be rewritten in matrix form as:

$$y = C(m + K(d - m)) \qquad \text{Equation 15}$$

where:

$$m = [NN(x_0, w) NN(x_1, w), \ldots, NN(x_{T-1}, w)]^T \qquad \text{Equation 16}$$

Given $\epsilon = [\epsilon_1\ \epsilon_2\ \ldots\ \epsilon_t\ \ldots\ \epsilon_T]^T$, the error function can be written as:

$$E = \frac{1}{2}\alpha w^T w + \frac{1}{2}\epsilon^T C \epsilon \qquad \text{Equation 17}$$

Then, the derivative of the error with respect to the weights, given by Equation 8, can be rewritten as:

$$\frac{\partial E}{\partial w} = \alpha w + \epsilon^T C(I - K)\frac{\partial m}{\partial w} \qquad \text{Equation 18}$$

where $$\frac{\partial m}{\partial w}$$

is a T×N matrix, and T is the number of samples in the dataset, and N is the number of weights, and I is the identity matrix of size T×T.

Similarly, the derivatives of the error with respect to the feedback coefficient of Equation 9 may be given by:

$$\frac{\partial E}{\partial k} = -\epsilon^T C S \epsilon' \quad \text{Equation 19}$$

where $\epsilon' = [\epsilon_1' \, \epsilon_2' \, \ldots \, \epsilon_t' \, \ldots \, \epsilon_T']^T$. Further, it can be shown that:

$$\epsilon = C(I-K)\epsilon' \quad \text{Equation 20}$$

Thus, the equations above may be rewritten as:

$$\frac{\partial E}{\partial w} = \alpha w + e'^T (I-K)^T C (I-K) \frac{\partial m}{\partial w} \quad \text{Equation 21}$$

and $$\frac{\partial E}{\partial k} = -\epsilon'^T (I-K)^T C S \epsilon' \quad \text{Equation 22}$$

As will be appreciated, these equations are needed to compute the Hessian, which is described in the next section.

Computing the Hessian

To implement the probabilistic version of the disturbance rejection algorithm, the data Hessian, which is the second derivative of the data component of the error with respect to the weights, may be required. The Hessian, H, may be defined as:

$$H = \frac{\partial^2 E_D}{\partial^2 w} \quad \text{Equation 23}$$

where the data component of the error is defined by:

$$E_D = \tfrac{1}{2}\epsilon^T C \epsilon \quad \text{Equation 24}$$

Further, the Hessian may be computed using a modified version of the R-propagation algorithm. As will be appreciated, R-propagation is an efficient algorithm for multiplying a vector by the Hessian. The vector, v, may be defined as:

$$v = [v_1 v_2 \ldots v_t \ldots v_N]^T \quad \text{Equation 25}$$

where N is the number of weights in the weight vector. Multiplying v by H gives:

$$v^T H = v^T \frac{\partial^2 E_D}{\partial^2 w} \quad \text{Equation 26}$$

which can be written as:

$$v^T H = v^T \frac{\partial}{\partial w}\left(\frac{\partial E_D}{\partial w}\right) \quad \text{Equation 27}$$

which can be rewritten to:

$$v^T H = R\left\{\frac{\partial E_D}{\partial w}\right\} \quad \text{Equation 28}$$

where R{ } is the R-propagation operator. The ith column of the Hessian can be computed by selecting the vector v to be a vector of length N composed of all zeros except the ith element which contains a 1. By extension, the Hessian can be computed using N vector multiples to derive the N columns of the Hessian.

To compute the R-propagation value, the forward propagation needs to be expressed through a neural network in matrix form. First, the weight matrices used in the matrix form is defined. The N×1 weight vector of the neural network and its components are defined as:

$$w = [w_1 b_1 w_2 b_2]^T \quad \text{Equation 29}$$

where $w_1$ are the weights in the first layer and given by:

$$w_1 = [w_{1,1} w_{1,2} \ldots w_{1,H}] \quad \text{Equation 30}$$

where $w_{1,1}$ are the weights between the inputs and the first hidden unit and are given by:

$$w_{1,1} = [w_{1,1,1} w_{1,1,2} \ldots w_{1,1,X}] \quad \text{Equation 31}$$

where $w_{1,1,1}$ is a weight in the first layer between the first input and first hidden unit. The weight vector between the input layer and the Hth hidden unit is given by:

$$w_{1,H} = [w_{1,H,1} w_{1,H,2} \ldots w_{1,H,X}] \quad \text{Equation 32}$$

where $w_{1,H,N}$ is the weight in the first layer between the Nth input and Hth hidden unit. (X is the number of inputs and H is the number of inputs.)

The biases in the first layer may be defined as:

$$b_1 = [b_{1,1} b_{1,2} \ldots b_{1,H}] \quad \text{Equation 33}$$

where $b_{1,1}$ is the bias to the first hidden unit. The second layer weight vector may defined as:

$$w_2 = [w_{2,1} w_{2,2} \ldots w_{2,H}] \quad \text{Equation 34}$$

where $w_{2,1}$ is the weight between the first hidden unit and the output. Finally, $b_2$, is the bias of the output unit.

The input layer weight matrix may be defined as:

$$W_1 = [w_{1,1}{}^T w_{1,2}{}^T \ldots w_{1,H}{}^T] \quad \text{Equation 35}$$

Finally, a flattening function which converts a matrix of weights in the first layer into a weight vector of the first layer may be defined as:

$$w_1 = F(W_1) \quad \text{Equation 36}$$

For convenience, a 1×N vector v is defined in a similar manner:

$$v = [v_1 p_1 v_2 p_2]^T \quad \text{Equation 37}$$

where $v_1$ has the same structure as the weights in the first layer and given by:

$$v_1 = [v_{1,1} v_{1,2} \ldots v_{1,H}] \quad \text{Equation 38}$$

where $v_{1,1}$ is given by:

$$v_{1,1} = [v_{1,1,1} v_{1,1,2} \ldots v_{1,1,X}] \quad \text{Equation 39}$$

and $v_{1,H}$ is:

$$v_{1,H} = [v_{1,H,1} v_{1,H,2} \ldots v_{1,H,X}] \quad \text{Equation 40}$$

The vector $p_1$ is given by:

$$p_1 = [p_{1,1} p_{1,2} \ldots p_{1,H}] \quad \text{Equation 41}$$

The $v_2$ vector is:

$$v_2 = [v_{2,1} v_{2,2} \ldots v_{2,H}] \quad \text{Equation 42}$$

Finally, $p_2$ is a scalar.

Furthermore, $V_1$ is defined as:

$$V_1 = [v_{1,1}{}^T v_{1,2}{}^T \ldots v_{1,H}{}^T] \quad \text{Equation 43}$$

To write the matrix formulation, the inputs in vector form may be defined as:

$$X = \begin{bmatrix} x_0^T \\ x_1^T \\ \vdots \\ x_{T-1}^T \end{bmatrix} \quad \text{Equation 44}$$

The matrix (or vector), $O_{j,k}$, may be defined to be composed of a matrix with j rows and k columns and that contains ones in all elements. The hidden unit outputs over the dataset may be computed using:

$$A = XW_1 + O_{T,1}b_1 \quad \text{Equation 45}$$

and $$Z = h(A) \quad \text{Equation 46}$$

where h( ) is the hidden layer operator (typically the hyperbolic tangent) that operates on each element of the matrix, A. Thus, Z, contains the output of the hidden units across all samples in the dataset. The output of the neural network over the dataset may be given by:

$$m = Zw_2^T + O_{T,1}b_2 \quad \text{Equation 47}$$

Finally, the last step of the forward propagation may be computing the output y which is given by Equation 15 and is shown again here for convenience:

$$y = C(m + K(d-m)) \quad \text{Equation 48}$$

Now the R-propagation values for A, Z, and m are shown. Starting with A:

$$R\{A\} = XV_1 + O_{T,1}p_1 \quad \text{Equation 49}$$

To compute the R-propagation values of Z and other R-propagated values, the first and second derivatives of activation layer of the neural network may be needed. For the first derivative, the interest is in the first derivative of the output activation with respect to the input of the activation layer for each data sample. The first derivative of the output activations with respect to the input activations over the dataset can be computed by:

$$Z' = O_{T,N} + Z \circ Z \quad \text{Equation 50}$$

where $Z \circ Z$ represents the Hadamard product (element multiplication). Similarly, for the second derivative, the interest in the second derivative of the output activation with respect to the input of the activation layer for each data sample. The second derivative of the output activations with respect to the input activations over the dataset can be computed by:

$$Z'' = -2Z \circ Z' \quad \text{Equation 51}$$

The R-propagation value of Z is given by:

$$R\{Z\} = Z' \circ R\{A\} \quad \text{Equation 52}$$

and $R\{m\}$ is given by:

$$R\{m\} = R\{Z\}w_2^T + Zv_1 + O_{T,1}p_2 \quad \text{Equation 53}$$

The value for $R\{y\}$ can computed based on the definition of y given by Equation 48, $$R\{y\} = C(I-K)R\{m\} \quad \text{Equation 54}$$

The next step is to define the backpropagation through the disturbance rejection layer into the neural network. Define $u_2$ to be the derivative of error, E, with respect to the output of the neural network models, m. The vector $u_2$ is the backpropagated error to the output of the neural models and can be found using Equation 18 to be:

$$u_2 = (I-K)^T C\epsilon \quad \text{Equation 55}$$

As seen previously, a modified version of the output error, $\epsilon$, is backpropagated through the neural network. Now $U_1$ can be defined as being the derivative of error, E, with respect to the first layer activations of the neural network models over the dataset, $u_2$. The value of $U_1$ is:

$$U_1 = Z' \circ (u_2 w_2) \quad \text{Equation 56}$$

Given the backpropagation values, the R-propagation can be determined for $u_2$ and $U_1$. Using Equation 55, it is found:

$$R\{u_2\} = (I-K)^T CR\{y\} \quad \text{Equation 57}$$

The value for $R\{U_1\}$ is given as:

$$R\{U_1\} = Z'' \circ R\{A\} \circ (u_2 w_2) + Z' \circ (u_2 v_2) + Z' \circ (R\{u_2\}w_2) \quad \text{Equation 58}$$

The R-propagated values of the derivative of the error with respect to the weights are given by:

$$R\left\{\frac{\partial E_D}{\partial w}\right\} = \left[ R\left\{\frac{\partial E_D}{\partial w_1}\right\} R\left\{\frac{\partial E_D}{\partial b_1}\right\} R\left\{\frac{\partial E_D}{\partial w_2}\right\} R\left\{\frac{\partial E_D}{\partial b_2}\right\} \right] \quad \text{Equation 59}$$

where each of the terms of the equation are given by the following:

$$R\left\{\frac{\partial E_D}{\partial w_1}\right\} = F(X^T R\{U_1\}) \quad \text{Equation 60}$$

$$R\left\{\frac{\partial E_D}{\partial b_1}\right\} = O_{1,T} R\{U_1\} \quad \text{Equation 61}$$

$$R\left\{\frac{\partial E_D}{\partial w_2}\right\} = Z^T R\{u_2\} + R\{Z\}u_2 \quad \text{Equation 62}$$

$$R\left\{\frac{\partial E_D}{\partial b_2}\right\} = O_{1,T} R\{u_2\} \quad \text{Equation 63}$$

where F( ) is the flattening function used to convert from a matrix to a vector. Thus, using Equation 28, it is found that:

$$v^T H = \left[ R\left\{\frac{\partial E_D}{\partial w_1}\right\} R\left\{\frac{\partial E_D}{\partial b_1}\right\} R\left\{\frac{\partial E_D}{\partial w_2}\right\} R\left\{\frac{\partial E_D}{\partial b_2}\right\} \right] \quad \text{Equation 64}$$

where the terms of Equation 64 are defined by Equation 60-Equation 63. Once again, the full Hessian can be computed by doing N multiplication of $v^T H$ with the vector $v^T$ varying in each multiplication such that all elements are zero except for the ith element which is 1 in the ith multiplication.

Thus, as just provided, it has been shown how to compute the data component of the Hessian (the second derivative of the data component of the error with respect to the weights) given a weight vector w and a dataset d and X. As just discussed, the calculation may include Equations 44 through 63.

Disturbance Rejection with Additional Hyperparameters

To use Bayesian techniques on the disturbance rejection model of FIG. 5, it may be necessary to introduce more hyperparameters into the definition of the error function used in the disturbance rejection algorithm. The disturbance rejection algorithm uses only one hyperparameter in error, α. The matrix version of the error function was given as:

$$E = \frac{1}{2}\alpha w^T w + \frac{1}{2}\epsilon^T C\epsilon \quad \text{Equation 65}$$

where the hyperparameter, α, is a penalty on the weights. The hyperparameter, α, is typical found using cross-validation. A second hyperparameter, β, may be introduced in the error equation as follows:

$$E = \frac{1}{2}\alpha w^T w + \frac{1}{2}\beta \epsilon^T C\epsilon \quad \text{Equation 66}$$

Again, the hyperparameters, α and β, can be found using cross-validation techniques.

Next, the weights may be penalized independently by using a vector, α, defined as:

$$\alpha = [\alpha_1 \alpha_2 \ldots \alpha_i \ldots \alpha_N] \quad \text{Equation 67}$$

where N is the number of weights in the weight vector w. The error function with individual weight penalties then may be defined as:

$$E = \frac{1}{2}w^T(\text{Diag}(\alpha))w + \frac{1}{2}\beta \epsilon^T C\epsilon \quad \text{Equation 68}$$

where Diag(α) is an N×N matrix with α on the diagonal and zeros in all other elements. From this definition, it can be observed that the first weight in vector w is penalized by $\alpha_1$, the second weight by $\alpha_2$, etc. Using Equation 18, the derivative of the error may be computed with respect to the weights to be:

$$\frac{\partial E}{\partial w} = \text{Diag}(\alpha)w + \epsilon^T C(I-K)\frac{\partial m}{\partial w} \quad \text{Equation 69}$$

Thus, instead of penalizing all weights independently, it may be preferable to introduce structure into the penalty. It may be preferable to penalize all weights in the first layer of the neural network from the same input equally. In addition, it may be preferable to penalize all biases in the first layer equally and all weights in the second layer together. The output bias may be individually penalized. Given these preferences, an α can be found with the following structure:

$$\alpha = [\alpha_{w1}\alpha_{w1} \ldots \alpha_{w1}\alpha_{b1}\alpha_{w2}\alpha_{b2}] \quad \text{Equation 70}$$

where $\alpha_{w1}$ is repeated H times (for the H hidden units) and is defined as:

$$\alpha_{w1} = [\alpha_{w1,1}\alpha_{w1,2} \ldots \alpha_{w1,X}] \quad \text{Equation 71}$$

where $\alpha_{w1,1}$ is used to equally penalize the weight associated with the first input to all hidden layer units equally. Similarly, $\alpha_{b1}$ is used to penalize all biases in the first layer equally by $\alpha_{b1}$ and is defined by:

$$\alpha_{b1} = \alpha_{b1}O_{1,H} \quad \text{Equation 72}$$

And, similarly, $\alpha_{w2}$ is used to penalize all biases in the first layer equally by $\alpha_{w2}$ and is defined by:

$$\alpha_{w2} = \alpha_{w2}O_{1,H} \quad \text{Equation 73}$$

Finally, the scalar $\alpha_{b2}$ may be used to penalize the second layer bias of the neural network. Because the number of independent hyperparameters in α is equal to N+3, which is the number of inputs plus 3 and the number of inputs is typically greater than 10 in many real-world applications, cross validation typically is not practical for finding the values of α and β. The next section provides a method for finding the hyperparameters while also allowing us to calculate the variance of the output. Finally, the disturbance rejection algorithm in matrix form with additional hyperparameters is derived in this section. For convenience, the weights and feedback coefficient that minimize the error function found using this algorithm shall be denoted as $w_{MAP}$ and k*.

Bayesian Prediction

It may be desired to predict the probabilistic distribution of the generalized output, $\tau_t$, given a model, set of input vectors, $x_{t-1}$ and $x_{t-2}$, and the output at time (t−1), $d_{t-1}$. (It should be noted that these general variables representing the output and inputs vector at any arbitrary time rather than data specifically in a training dataset.) The Bayesian evidence framework may be used to derive the desired probabilistic distribution, as described below.

First, it may be assumed that the conditional distribution of the output with respect to the inputs, $p(\tau_t|x_{t-1},x_{t-2})$ is Gaussian with a mean dependent upon the output of disturbance rejection based model and the variance defined by the inverse variance of β:

$$p(\tau_t|x_{t-1},x_{t-2},d_{t-1},w,\beta) = \mathcal{N}(\tau_t|y(x_{t-1},x_{t-2},d_{t-1},w),\beta^{-1}) \quad \text{Equation 74}$$

where $\mathcal{N}(\tau_t|y(x_{t-1},x_{t-2},w),\beta^{-1})$ represents the normal distribution with mean $y(x_{t-1},x_{t-2},w)$ and variance $\beta^{-1}$. The normal distribution then may be defined as:

$$\mathcal{N}(\tau_t|y(x_{t-1},x_{t-2},d_{t-1},w),\beta^{-1}) = \frac{1}{\sqrt{2\pi\beta^{-1}}}e^{\frac{-(\tau_t - y(x_{t-1},x_{t-2},d_{t-1},w))^2}{2\beta^{-1}}} \quad \text{Equation 75}$$

It is also desirous to define the prior distribution of the weights to be Gaussian and have the following form:

$$p(w|\alpha) = \mathcal{N}(w|O,\text{Diag}(\alpha^{-1})) \quad \text{Equation 76}$$

Thus, the weights are zero mean with a variance defined by $\text{Diag}(\alpha^{-1})$.

Assuming a set of T independent identically distributed samples of $d_t$, $x_{t-1}$ and $x_{t-2}$ defined by the dataset $D = \{d_2 \ldots d_T\}$ and $x_1 \ldots x_T$, the likelihood function is given by:

$$p(D|w,\beta) = \prod_{t=2}^{T}\mathcal{N}(\tau_t|y(x_{t-1},x_{t-2},d_{t-1},w),\beta^{-1}) \quad \text{Equation 77}$$

and the posterior distribution is given by:

$$p(w|D,\alpha,\beta) = p(w|\alpha)p(D|w,\beta) \quad \text{Equation 78}$$

The weights associated with the maximum of the posterior distribution, $w_{MAP}$, can found by maximizing the log of the posterior which is given by:

$$\ln p(w|D,\alpha,\beta) = -\frac{1}{2}w\text{Diag}(\alpha)w^T - \frac{\beta}{2}\sum_{t=2}^{T}(y_t - d_t)^2 \quad \text{Equation 79}$$

As will be appreciated, this is equivalent to:

$$\ln p(w|D,\alpha,\beta) = -\frac{1}{2}w^T(\text{Diag}(\alpha))w - \frac{1}{2}\beta \epsilon^T C\epsilon \quad \text{Equation 80}$$

From the definition of the error function in Equation 68, it can be found that:

$$\ln p(w|D,\alpha,\beta) = -E \quad \text{Equation 81}$$

Thus, minimizing the error function of Equation 68 is equivalent to maximizing the posterior distribution of Equation 78. Hence, the disturbance rejection algorithm given above can be used to find the set of weights that maximize the posterior, $w_{MAP}$. The resulting feedback coefficient from the disturbance rejection algorithm is denoted as k*.

Given the weights that maximize the posterior, $w_{MAP}$, the marginal probability of an output prediction may be determined by:

$$P(\tau_t|D,x_{t-1},x_{t-2},d_{t-1},w,\alpha,\beta) = \mathcal{N}(\tau_t|y(x_{t-1},x_{t-2},d_{t-1},w_{MAP}),\sigma^2(x_{t-1},x_{t-}) \quad \text{Equation 82}$$

Thus, the prediction is normally distributed around $y(x_{t-1}, x_{t-2}, d_{t-1}, w_{MAP})$ with the variance defined as:

$$\sigma^2(x_{t-1},x_{t-2},d_{t-1},w_{MAP}) = \beta^{-1} + g_t^T A^{-1} g_t \quad \text{Equation 83}$$

where A is the second derivative of the output with respect to the weights and is given by:

$$A = \text{Diag}(\alpha)I + \beta H \quad \text{Equation 84}$$

where the R-propagation algorithm output in the previous section can be used to compute the Hessian, H. The vector, $g_t$ may be defined as:

$$g_t = \frac{\partial y(x_{t-1}, x_{t-2}, w)}{\partial w}\bigg|_{w=w_{MAP}} \quad \text{Equation 85}$$

which using Equation 3 can be written as:

$$g_t = \left(\frac{\partial NN(x_{t-1}, w)}{\partial w} - k * \frac{\partial NN(x_{t-2}, w)}{\partial w}\right)\bigg|_{w=w_{MAP}} \quad \text{Equation 86}$$

Since the gradient of the output of neural network with respect to the weights can be computed by backpropagating a value of 1 into the network, the two partials of the equation above can be computed by backpropagating a 1 into the networks given by $NN(x_{t-1}, w_{MAP})$ and $NN(x_{t-2}, w_{MAP})$. Using the definition of the normal distribution in Equation 82, it is found that the output distribution is:

$$p(\tau_t | D, x_{t-1}, x_{t-2}, d_{t-1}, w, \alpha, \beta) = \frac{e^{\frac{-(\tau_t - y(x_{t-1},x_{t-2},d_{t-1},w_{MAP}))^2}{2\sigma^2(x_{t-1},x_{t-2},d_{t-1},w_{MAP})}}}{\sqrt{2\pi\sigma^2(x_{t-1}, x_{t-2}, d_{t-1}, w_{MAP})}} \quad \text{Equation 87}$$

Given $\alpha, \beta$ and the training set, D, the disturbance rejection algorithm is used to find $w_{MAP}$. Thus, given $w_{MAP}$ along with the hyperparameters $\alpha, \beta$, the probability distribution for the model of FIG. 5 can be written as a function of only the inputs to the model:

$$p(\tau_t | x_{t-1}, x_{t-2}, d_{t-1}) = \frac{e^{\frac{-(\tau_t - y(x_{t-1},x_{t-2},d_{t-1},w_{MAP}))^2}{2\sigma^2(x_{t-1},x_{t-2},d_{t-1},w_{MAP})}}}{\sqrt{2\pi\sigma^2(x_{t-1}, x_{t-2}, d_{t-1}, w_{MAP})}} \quad \text{Equation 88}$$

Determining the Hyperparameters

By starting with an initial guess for $\alpha$ and $\beta$, which is typically 1 for all values, the weights that maximize the posterior distribustion, $w_{MAP}$, and the trained feedback coefficient, k*, can be determined using the disturbance rejection algorithm summarized above. Conventional methods provide algorithms for updating $\alpha$ and $\beta$ given a dataset and $w_{MAP}$ in the case of a standard neural network. In the present application, these algorithms have been extended to the disturbance rejection based neural network model of FIG. 5.

Before presenting the updated algorithm, the vector $q(\alpha_{w1,1})$ must first be defined as:

$$q(\alpha_{w1,1}) = [q_1(\alpha_{w1,1}) \ldots q_i(\alpha_{w1,1}) \ldots q_N(\alpha_{w1,1})] \quad \text{Equation 89}$$

where $\alpha_{w1,1}$ is contained in the vector $\alpha$ as defined in Equation 70, N is the number of weights, and $q_i(\alpha_{w1,1})$ is defined as:

$$q_i(\alpha_{w1,1}) = \begin{cases} 1 \text{ if } \alpha_i = \alpha_{w1,1} \\ 0 \text{ if } \alpha_i \neq \alpha_{w1,1} \end{cases} \quad \text{Equation 90}$$

where $\alpha_i$ is the ith element of the vector $\alpha$. Thus, the vector $q(\alpha_{w1,1})$ denotes with a 1 where $\alpha_{w1,1}$ appears in the vector $\alpha$. Similarly, the vectors $q(\alpha_{w1,i})$, $q(\alpha_{w2})$, and $q(\alpha_{b2})$ can be defined to denote where $(\alpha_{w1,i})$, $(\alpha_{w2})$, and $(\alpha_{b2})$ appear in the vector $\alpha$. For convenience, the set $\{q_1, \ldots, q_i, \ldots, q_X, q_{X+1}, q_{X+2}, q_{X+3}\}$ is defined by the following:

$$q_1 = q(\alpha_{w1,1}) \quad \text{Equation 91}$$

$$q_i = q(\alpha_{w1,i}) \quad \text{Equation 92}$$

$$q_X = q(\alpha_{w1,X}) \quad \text{Equation 93}$$

$$q_{X+1} = q(\alpha_{b1}) \quad \text{Equation 94}$$

$$q_{X+2} = q(\alpha_{w2}) \quad \text{Equation 95}$$

$$q_{X+3} = q(\alpha_{b2}) \quad \text{Equation 96}$$

where X is the number of inputs in the network. For convenience, the vector $\alpha$ is defined as:

$$\alpha = [\alpha_{w1,1} \ldots \alpha_{w1,i} \ldots \alpha_{w1,X} \alpha_{b1} \alpha_{w2} \alpha_{w2}] \quad \text{Equation 97}$$

Furthermore, the scalar $\gamma_i$ may be defined as:

$$\gamma_i = \sum_{j=1}^{N} q_{i,j} - a_i(q_i(diag(H^{-1}))) \quad \text{Equation 98}$$

where $q_{i,j}$ is the jth element of the vector $q_i$. Given the definition for the scalar $\gamma_i$, the vector $\gamma$ is:

$$\gamma = [\gamma_1 \ldots \gamma_i \ldots \gamma_{X+3}] \quad \text{Equation 99}$$

The updated versions of the elements of the vector $\alpha$ are given by:

$$a_i = \frac{\gamma_i}{(q_i \circ w_{MAP}) w_{MAP}^T} \quad \text{Equation 100}$$

An updated version of all X+3 elements of the vector $\alpha$ can be computed and the resulting values can be used to update the values of the vector $\alpha$.

The update equation then for β is given by:

$$\beta = \frac{N - \sum_{i=1}^{X+3} \gamma_i}{\epsilon^T C \epsilon} \qquad \text{Equation 101}$$

Then, using Equation 100 and Equation 101, the hyperparameters α and β can be updated. It should be noted that the re-estimation given in Equation 100 and Equation 101 are often repeated $N_b$ times in a row to re-estimated α and β where $N_b$ is a user specified number, which was 3 in the prior exemplary implementation.

Bayesian Disturbance Rejection Algorithm

Figure 6:
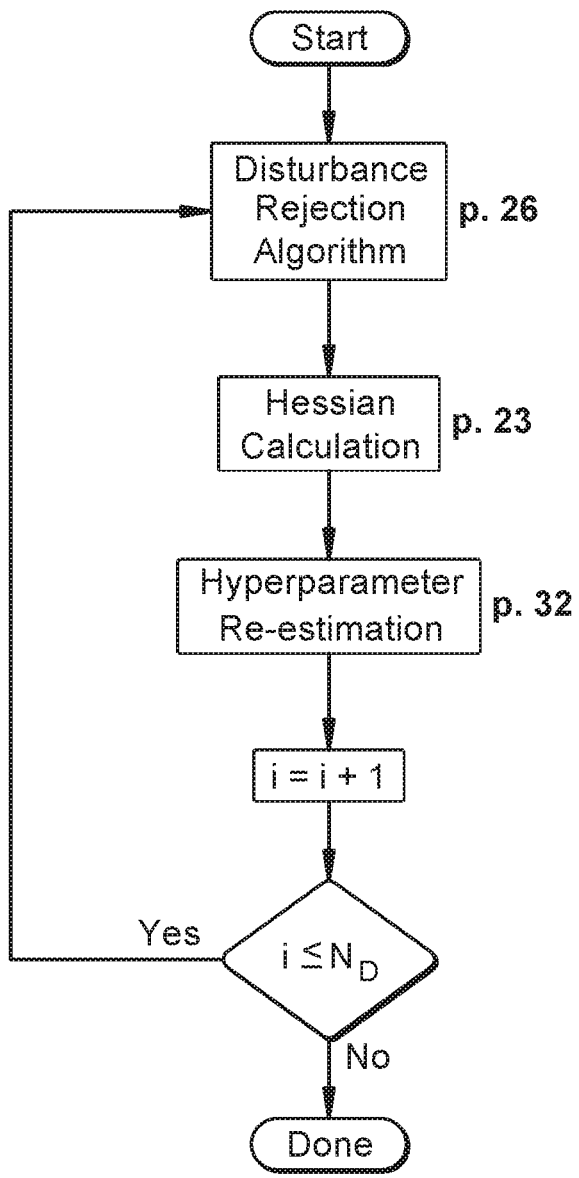
FIG. 6 shows a flow diagram of the Bayesian disturbance rejection algorithm as may be used to compute the trained values of the hyperparameters, the weights, and the feedback coefficient of the model in FIG. 5 in accordance with aspects of the present invention.

FIG. 6 shows a flow diagram of the Bayesian Disturbance Rejection Algorithm which is used to compute the trained values of the hyperparameters α and β, the weights, $w_{MAP}$, and the feedback coefficient, k* of the model in FIG. 5. The trained values can subsequently be used in to compute the probability distribution of the output of FIG. 5 using the Bayesian Disturbance Rejection Prediction Calculation.

To use the algorithm of FIG. 6, the following is needed: a training dataset d and X (typically collected using Design of Experiment), an initial set of weights w (typically randomly generated), an initial value of k (typically 1), an initial set of hyperparameters α and β (typically all values are set to 1), a user specified number of times to repeat the main loop, $N_D$ (typically 5), and a user specified number of times to repeat the re-estimation, $N_b$ (typically 3).

Given the initial values, the Disturbance Rejection Algorithm is executed first as shown in FIG. 6. The results are then used to compute the data component of the Hessian using the Hessian calculation outlined above. Given the results of the Disturbance Rejection Algorithm and the Hessian Calculation, the hyperparameters α and β are re-estimated using the Hyperparameter Re-estimation calculation. Next, a counter of the number of time through the main loop, i, is updated (i is initialized at 0). If the main loop counter, i, is less than $N_D$ the main loop is repeated otherwise the algorithm exits with the trained values for the hyperparameters α and β, the weights, $w_{MAP}$, and the feedback coefficient, k* of the model.

The algorithm shown in FIG. 6 is the preferred embodiment. However, extensions may be used which rely on cross-validation techniques for the selection of the following initial values: hyperparameters α and β, number of times to repeat the main loop, $N_D$ (typically 5), and number of times to repeat the re-estimation, $N_b$ (typically 3). Specifically, the hyperparameters α and β have be initialized based upon the results of a cross-validation of initial hyperparameters over the set of values {0.001, 0.01, 0.1, 1, 10, 100}. Using cross-validation to determine the initial hyperparameters for the algorithm of FIG. 6 has proved to be useful.

Calculating Overall Model Confidence

Once the model is trained, the model of the form shown in FIG. 5 is used for optimization. Often, the mean value of the prediction is used which is given by $y(x_{t-1}, x_{t-2}, d_{t-1}, w_{MAP})$. To perform optimization correctly, it is desirable to be able to predict the correct sign of the direction of the change in the output due to changes in the input. Hence, it is desirable to know for a trained model what the probability that the sign of the predicted change in the output is correct. This probability can be defined as:

$$p\left(\frac{\text{sign}(\tau_t - d_{t-1})}{\text{sign}(y(x_{t-1}, x_{t-2}, d_{t-1}, w_{MAP}) - d_{t-1})} > 0\right) \qquad \text{Equation 102}$$

where the function sign( ) is used to compute the sign of the values.

Figure 7:
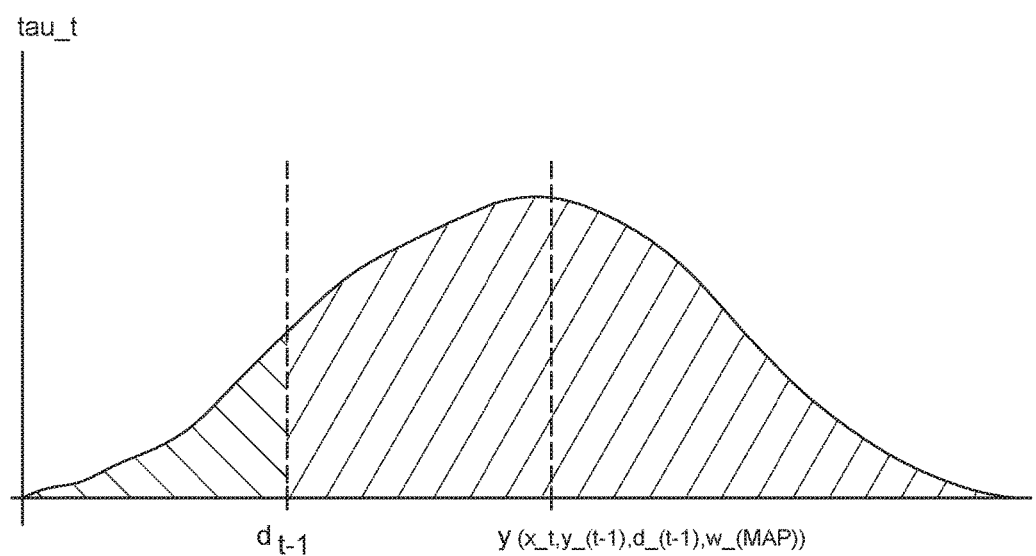
FIG. 7 shows the probability sample for a given point in the dataset as may be computed pursuant to aspects of the present invention.

The probability distribution above can be approximated by sampling the probability distribution over the training dataset. The probability sample for a given point in the dataset may computed as shown in FIG. 7. The probability distribution computed for any given point in the dataset can be computed using the Bayesian Disturbance Rejection Prediction Calculation. The resulting probability distribution at time (t) is shown as the normal distribution shown in FIG. 7 with a mean of $y(x_{t-1}, x_{t-2}, d_{t-1}, w_{MAP})$ and a variance of $\sigma^2(x_{t-1}, x_{t-2}, d_{t-1}, w_{MAP})$). In the example in FIG. 7, the value of $\text{sign}(y(x_{t-1}, x_{t-2}, d_{t-1}, w_{MAP}) - d_{t-1})$ is positive. The probability that $\text{sign}(\tau_t - d_{t-1})$ is also positive is given by the area under the normal distribution that is greater than $d_{t-1}$.

The area under the normal distribution can be computed using the error function. The integration of a Gaussian center at zero with a standard deviation of σ is given by:

$$\Phi(x) = \frac{1}{2} + \frac{1}{2}\text{erf}\left(\frac{x}{\sqrt{2}\,\sigma}\right) \qquad \text{Equation 103}$$

where erf( ) is the Gaussian error function. Given the known output at time t−1 which is given by $d_{t-1}$, the probability that the prediction of the output at time t which is given by Equation 82 has the correct sign is given by:

$$\Phi(|y(x_{t-1}, x_{t-2}, w_{MAP}) - d_{t-1}|) = \qquad \text{Equation 104}$$
$$\frac{1}{2} + \frac{1}{2}\text{erf}\left(\frac{|y(x_{t-1}, x_{t-2}, w_{MAP}) - d_{t-1}|}{\sqrt{2}\,\sigma^2(x_{t-1}, x_{t-2}, w_{MAP})}\right)$$

The equation above gives the sampled probability at one data point in the dataset. The overall sampled probability can be calculated by averaging over the dataset. Furthermore, for convenience, reference will be made to probability multiplying by 100% as the over model confidence. Thus, the overall confidence of the model, η, is defined as the mean of the confidence over a dataset (typically, the training set) and is given by:

$$\eta = 100 \frac{\sum_{t=2}^{T} C_{t,t} \Phi(|y(x_{t-1}, x_{t-2}, w_{MAP}) - d_{t-1}|)}{\sum_{t=2}^{T} C_{t,t}} \qquad \text{Equation 105}$$

where $C_{t,t}$ is the $t^{th}$ element of the diagonal of the matrix C.

Calculating Model Confidence Associated with Each Input

As will be appreciated, interest is not limited to overall confidence, but may also extends to the confidence associated with each of the inputs to the model, which is discussed in the following section. To computed the confidence associated with each input, the input matrix, X, is expanded such that it contains individual input moves per variable. First, all moves in the input matrix may be identified by defining the matrix, B, which is a T−1×T matrix given by:

$$B = \begin{bmatrix} 1 & -1 & 0 & & 0 & 0 & 0 \\ 0 & 1 & -1 & \cdots & 0 & 0 & 0 \\ 0 & 0 & 1 & & 0 & 0 & 0 \\ \vdots & & & \ddots & & & \vdots \\ 0 & 0 & 0 & & -1 & 0 & 0 \\ 0 & 0 & 0 & \cdots & 1 & -1 & 0 \\ 0 & 0 & 0 & & 0 & 1 & -1 \end{bmatrix} \quad \text{Equation 106}$$

Using matrix B, Ω may be defined, which is a T−1×X matrix of the difference in the inputs given by:

$$\Omega = BX \quad \text{Equation 107}$$

Thus, Ω, contains the changes in the inputs over the dataset. Furthermore, the matrix, δ, may be defined which is a T×X matrix with elements given by:

$$\delta_{i,j} = \begin{cases} 1 \text{ if } \Omega_{i,j} \neq 0 \\ 0 \text{ if } \Omega_{i,j} = 0 \end{cases} \quad \text{Equation 108}$$

Thus, the matrix, δ, indicates where moves in the inputs have occurred in the dataset.

To compute the confidence per inputs, a new input matrix, Γ, needs to be defined as:

$$\Gamma = \begin{bmatrix} x_0^T \\ x_0^T \\ x_1^T \\ x_1^T \\ \vdots \\ x_{T-2}^T \\ x_{T-2}^T \end{bmatrix} \quad \text{Equation 109}$$

Furthermore, the vector, $l_j$, needs to be defined as:

$$l_j = \begin{bmatrix} x_{0,j}^T \\ x_{1,j}^T \\ x_{1,j}^T \\ x_{2,j}^T \\ \vdots \\ x_{T-2,j}^T \\ x_{T-1,j}^T \end{bmatrix} \quad \text{Equation 110}$$

Finally, matrix, $\Lambda^j$, needs to be defined as:

$$\Lambda^j = [\Gamma_1 \Gamma_2 \ldots l_j \ldots \Gamma N] \quad \text{Equation 111}$$

where $\Gamma_i$ represents the ith column of matrix $\Gamma_i$. As will be appreciated, the matrix $\Lambda^j$ contains the T-paired moves of the jth input while all other variables are held equal. This matrix can then be used to compute the confidence for the jth input, $\psi_j$, using $$\psi_j = 100 \frac{\sum_{t=2}^{T} \delta_{t-1,j} C_{t,t} \Phi(|y(\Lambda_{2(t-1)}^j, \Lambda_{2(t-1)-1}^j, w_{MAP}) - d_{t-1}|)}{\sum_{t=2}^{T} \delta_{t-1,j} C_{t,t}} \quad \text{Equation 112}$$

where $\Lambda_i^j$ is the ith row of the matrix $\Lambda^j$. The confidence of each input is simply the average confidence of every move associate with the input in the dataset while holding all other inputs constant. The confidence vector of all N inputs can be defined as:

$$\psi = [\psi_1 \ldots \psi_j \ldots \psi_N] \quad \text{Equation 113}$$

Design of Experiments Based on Model Confidence

Figure 8:
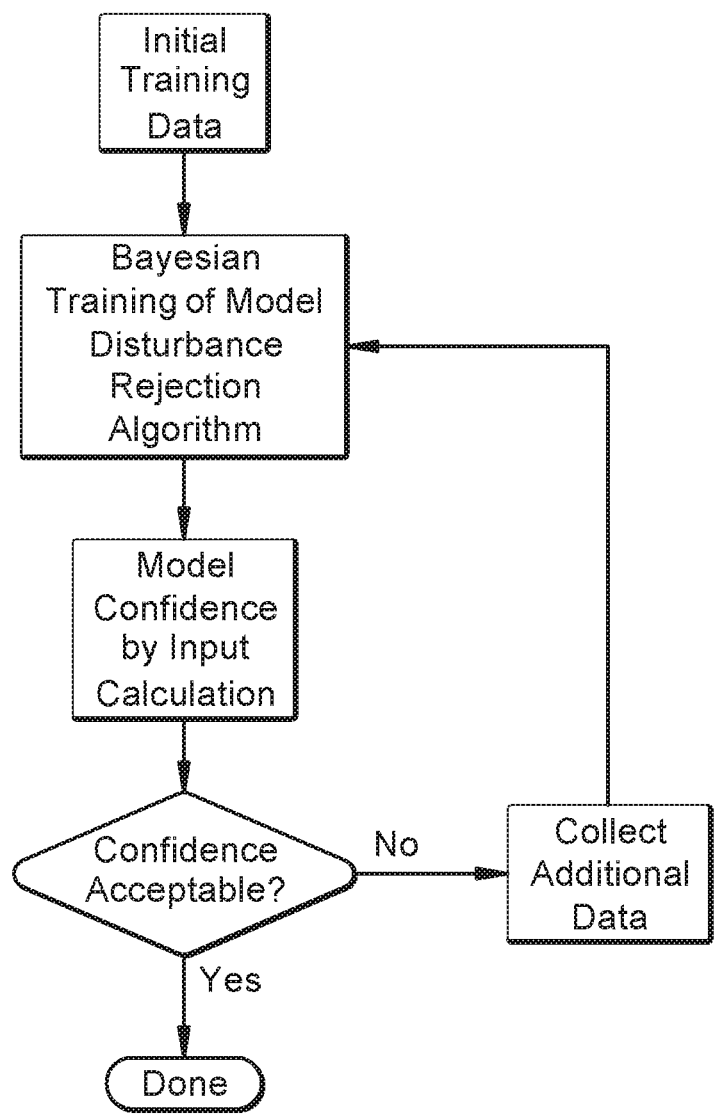
FIG. 8 illustrates how model confidence may be to expand the collection of data used to train a model in accordance with embodiments of the present invention.

As discussed in relation to FIG. 3, a "Design of Experiment" process may be used to collect data for training the disturbance rejection model of FIG. 5. FIG. 8 shows how the model confidence by input can be used to automatically expand the collection of data used to train a model. The flow diagram in FIG. 8 starts with the initial collection of data as shown in FIG. 3. In this case, the training data d and X which contain T training exemplars is shown. Given the initial training data, as shown in FIG. 8, the Bayesian Disturbance Rejection algorithm can be used to train the model of FIG. 5. Next, in FIG. 8, the Model Confidence by Input Calculation is performed. Results of the Confidence Calculation can be compared to a threshold, in this case 90%, as shown in the table illustrated in FIG. 9 for six MVs, $MV_1$-$MV_6$. If the confidence is above the threshold, no further additional data needs to be collected. However, if the data is below the acceptable confidence, additional Design of Experiments can be run for these MVs. For example, 10 additional experiments could be performed for each MV that does not reach the acceptable confidence. As shown in FIG. 8, the additional data can be added to the original training dataset to create a new dataset. Using this dataset, the model can be retrained. This process can be repeated until the necessary confidence per input is achieved. Thus, an automated method for training a model can be implemented based upon the confidence calculation.

An extension to the method shown in FIG. 8 allows automatic selection of the inputs based upon the confidence. It may be found that collecting additional data in FIG. 8 does not results in the confidence exceeding the threshold after collecting additional data. In this case, instead of continuing to run the main loop of FIG. 8, it may be preferable to run the main loop at most 3 times and then eliminate any inputs from the model that have not achieved the desired confidence threshold. Once the inputs have been eliminated, the Bayesian Disturbance Rejection Algorithm can be run to train the model and a final check can be done to verify that the remaining inputs are above the threshold. If not above the threshold, the inputs can be removed, training done again, and the confidence threshold checked. This cycle can continue until all inputs have a confidence above the acceptable confidence.

Figure 10:
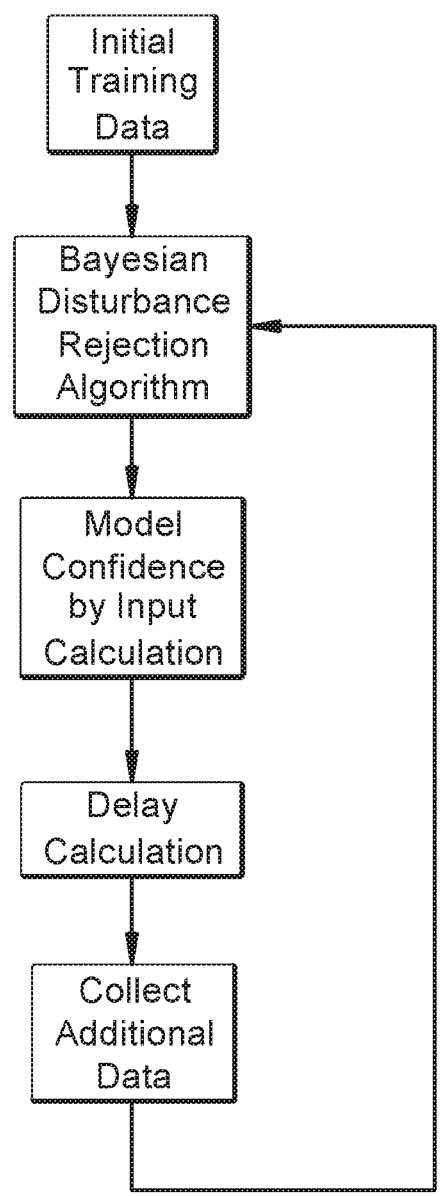
FIG. 10 illustrates a flow diagram according to the present invention for updating or training a model where additional data is collected periodically.

The flow diagram of FIG. 10 may be used to do a daily update of the model where additional data is collected each day for use in training the model. Again, an initial set of data is used to train a model using the Bayesian Disturbance Rejection Algorithm of FIG. 6. Next, the model confidence per input is computed. At this point, a delay is introduced into the loop typically of approximately one day. During this time, as discussed below, the model is used in the closed loop optimizer of FIG. 2. However, after a 24 hour wait period, the delay is stopped and additional data is collected as shown in FIG. 10. It should be noted that the delay may be extended if other conditions are not met such as the unit being at steady state. The confidence calculation per input is used in collecting additional data. Typically, two inputs are selected randomly based upon their confidence for design of experiments testing over a one hour period. If the sample period is 15 minutes, two moves per selected input are made during the data collection. The criteria for selecting which inputs to test is based upon the random draw of two inputs where the probability of selection is a weighted inverse of the confidence of the input. Thus, inputs with lower confidence are more likely to be tested. As shown in FIG. 10, the additional collected data is added to the original data and the model is retrained. The main loop executes approximately once a day and data is added to the model for training based upon the model confidence by input calculation. It should be noted that the Bayesian Disturbance Rejection Algorithm shown in FIG. 10 could be replaced by the algorithm shown in FIG. 8. In addition, the input selection algorithm described above could be used to the replace the Bayesian Disturbance Rejection.

Optimizer

As shown in FIG. 2, an optimizer is used to minimize a "cost function" subject to a set of constraints. The cost function is a mathematical representation of a desired goal or goals. For instance, to minimize NOx, the cost function includes a term that decreases as the level of NOx decreases. One common method for minimizing a cost function is known as "gradient descent optimization." Gradient descent is an optimization algorithm that approaches a local minimum of a function by taking steps proportional to the negative of the gradient (or the approximate gradient) of the function at the current point.

Constraints may be placed upon both the inputs (MVs) and outputs (CVs) of the boiler at a future time. Typically, constraints that are consistent with limits associated with the DCS are placed upon the manipulated variables. Constraints on the outputs (CVs) are determined by the problem that is being solved.

A nonlinear model can be used to determine the relationship between the inputs and outputs of a boiler. Accordingly, a nonlinear programming optimizer is used to solve the optimization problem in accordance with this embodiment of the present invention. However, it should be understood that a number of different optimization techniques may be used depending on the form of the model and the costs and constraints. For example, it is contemplated that the present invention may be implemented by using, individually or in combination, a variety of different types of optimization approaches. These optimization approaches include, but not limited to, linear programming, quadratic programming, mixed integer non-linear programming (NLP), stochastic programming, global non-linear programming, genetic algorithms, and particle/swarm techniques. See R. Baldick, *Applied Optimization: Formulation and Algorithms for Engineering Systems*, Cambridge University Press, Cambridge, UK, 2009.

Given the cost function and constraints, a non-linear program (NLP) optimizer typically solves problems with 20 manipulated variables and 10 controlled variables in less than one second. This is sufficiently fast for most applications since the optimization cycle is typically in the range of anywhere from 20 seconds to 20 minutes. More details on the formulation of the cost function and constraints are provided in the reference S. Piche, B. Sayyar-Rodsari, D. Johnson and M. Gerules, "Nonlinear model predictive control using neural networks," *IEEE Control Systems Magazine*, vol. 20, no. 2, pp. 53-62, 2000, which is fully incorporated herein by reference.

Figure 11:
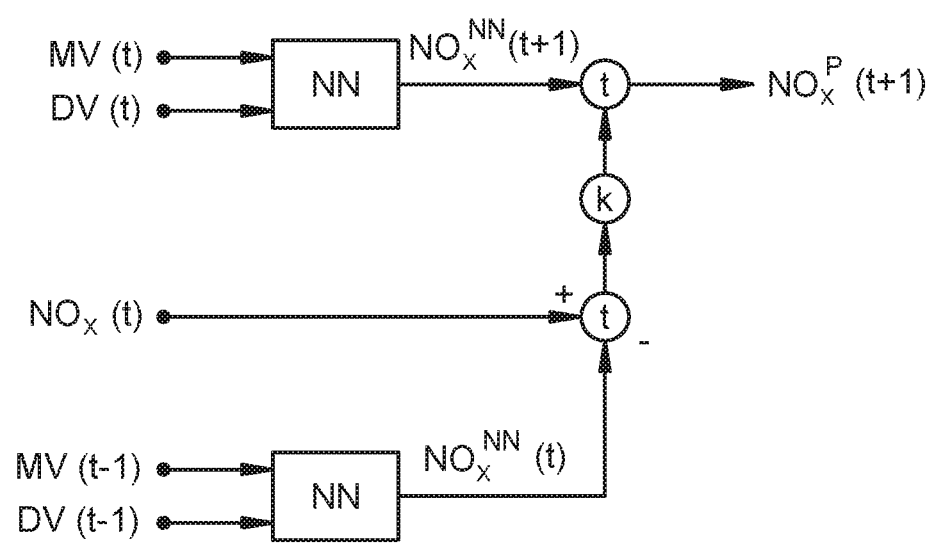
FIG. 11 illustrates a form of the disturbance rejection model that may be used for optimization.

With reference now to FIG. 11, a form of the disturbance rejection model is shown that is useful for optimization. In this case, it is desirable to determine the MVs at time (t) in order to minimize a cost function which is based upon the CVs at time (t+1). In addition, the MVs and DVs at time (t−1) and the resulting CV at time (t) are known, which may be used to calculate a bias adjusted value $k(NO_x(t)-NO_x^{NN}(t))$ that is added to the neural network prediction at time (t+1), $NO_x^{NN}(t+1)$. In the optimizer, the bias adjusted value, $k(NO_x(t)-NO_x^{NN}(t))$, is fixed. In addition, the measured disturbance value, DV(t), is fixed. Thus, only the values of MV(t) may be adjusted by the optimizer to determine the CV of interest, in this case, $NO_x^P$ (t+1). Typically, the optimizer is executed at the same frequency as the sampling period of the original data. If the sampling period was 15 minutes as shown in FIG. 3, then the optimizer would be executed every 15 minutes and the results of the optimizer would be output to the DCS and held for 15 minutes.

Optimization Example Using Mean Value of the Bayesian Disturbance Rejection Prediction In this section, it is shown how a model of the form shown in FIG. 11 which is trained using the Bayesian Disturbance Rejection Algorithm can be used in an optimization solution to determine a set of MVs at time (t). Specifically, the mean value of the Bayesian Disturbance Rejection Prediction Calculation will be used in the optimization problem in this section. In the next section, the probability distribution of the prediction is used in the optimization problem.

Without a loss of generality, the vector of MVs and DVs at time (t) can be represented by the vector $x_t$. The optimizer will be used to determine the optimal values of the MVs, hence, only the terms of vector $x_t$ representing the MVs will be optimized while the other terms representing the DVs will be held constant.

As shown in FIG. 11, in optimization, it is desirable to determine the optimal values for the vector $x_t$ at current time t to affect the output in the future $y_{t+1}$ given the inputs from a previous time, $x_{t-1}$, and the reading of the actual value of the output at the current time, $d_t$. Using Equation 2, it is found that:

$$y_{t+1} = m_{t+1} + k(d_t - m_t) \quad \text{Equation 114}$$

Substituting in a neural network with trained weights, $w_{MAP}$, and feedback coefficient, $k^*$, computed using the Bayesian Disturbance Rejection Algorithm (FIG. 6) or the algorithms shown in FIGS. 8 and 9, the following prediction of the output is provided:

$$y_{t+1} = NN(x_t, w_{MAP}) + k^*(d_t - NN(x_{t-1}, w_{MAP})) \quad \text{Equation 115}$$

It may be desirous to predict the value of NOx at time (t+1). Using the training algorithms described above, an optimal set of weights to predict NOx, which are $w_{MAP,NOx}$ and the feedback coefficient, $k_{NOx}^*$, can be determine. The prediction of mean value of the NOx is given by:

$$y_{t+1,NOx} = NN(x_t, w_{MAP,NOx}) + k_{NOx}^*(d_t - NN(x_{t-1}, w_{MAP,NOx})) \quad \text{Equation 116}$$

Similarly, a prediction of CO could be defined as:

$$y_{t+1,CO} = NN(x_t, w_{MAP,CO}) + k_{CO}^*(d_t - NN(x_{t-1}, w_{MAP,CO})) \quad \text{Equation 117}$$

As shown above, optimization may be performed by defining a cost function and a set of constraints and then minimizing the cost function while observing the constraints. The cost function and constraints represent the problem that one desires to solve. In an exemplary case, it is desirable to minimize the NOx, maintain the CO below a certain level, minimize the change in the inputs (MVs), and maintain the inputs in a bounded region. The cost function is used to express the desire to minimize the NOx, maintain the CO below a certain level, and minimize the change in the inputs. Constraints are used to maintain the inputs in a bounded region.

An exemplary cost function to achieve these goals may be defined as:

$$J(x_t) = \frac{\pi_1}{2} y_{t+1,NOx}^2 + \pi_2 s e^{\frac{(y_{t+1,CO}-b_{co})}{s}} + \frac{\pi_3}{2}(x_t - x_{t-1})^T(x_t - x_{t-1}) \quad \text{Equation 118}$$

where $\pi_1$, $\pi_2$, and $\pi_3$ are tuning constants for the optimization problem and are set by the user to achieve an appropriate desired balance between the three goals in the cost function. The first term of the equation above is used to minimize NOx, the second term is used to penalize CO over the bound $b_{co}$ (s is used to scale the penalty), and the final term is used to penalize movement in the inputs. The constraints are implement by the following bounds on the inputs:

$$b_{x,-} \leq x_t \leq b_{x,+} \quad \text{Equation 119}$$

where the vectors $b_{x,-}$ and $b_{x,+}$ represent the lower and upper bounds respectively on the input at time t.

According to exemplary embodiments, a gradient descent optimizer may be used to determine the minimal value of $J(x_t)$ while observing the constraints on the inputs. To perform gradient descent, the gradient of the cost function with respect to the inputs at time (t) is needed:

$$\frac{\partial J(x_t)}{\partial x_t} = \pi_1 y_{t+1,NOx} \frac{\partial y_{t+1,NOx}}{\partial x_t} + \pi_2 e^{\frac{(y_{t+1,CO}-b_{co})}{s}} \frac{\partial y_{t+1,CO}}{\partial x_t} + \pi_3(x_t - x_{t-1}) \quad \text{Equation 120}$$

Using Equation 116 and Equation 117, the previous equation can be written as:

$$\frac{\partial J(x_t)}{\partial x_t} = \pi_1 y_{t+1,NOx} \frac{\partial NN(x_t, w_{MAP,NOx})}{\partial x_t} + \pi_2 e^{\frac{(y_{t+1,CO}-b_{co})}{s}} \frac{\partial NN(x_t, w_{MAP,CO})}{\partial x_t} + \pi_3(x_t - x_{t-1}) \quad \text{Equation 121}$$

As will be shown, the first term of the previous equation can be computed by backpropagating the value $\pi_1 y_{t+1,NOx}$ through the neural network represented $NN(x_t, w_{MAP,NOx})$ to the inputs. Similarly, the second term can be computed by backpropagating the value $$\pi_2 e^{\frac{(y_{t+1,CO}-b_{co})}{s}}$$

through the neural network represented $NN(x_t, w_{MAP,CO})$ to the inputs. Thus, the derivative can be computed and steepest descent optimization may be performed to calculated the optimal value of $x_t$. The resulting optimized value for $x_t$ is output to the DCS and held constant for 15 minutes at which point another optimization cycle is executed.

Optimization Using the Probability Distribution of the Bayesian Disturbance Rejection Prediction As will be appreciated, the previous section uses the mean value of the Bayesian disturbance rejection prediction calculation in the cost function of the optimization problem. In this section, the probabilistic form given by Equation 87 will be used in the cost function. The models used in this section were trained using the Bayesian disturbance rejection algorithm, of FIG. 6, or the algorithms shown in FIGS. 8 and 9.

The probability distribution of the NOx at time t+1 is defined as $p(\tau_{t+1,NOx}|D_{NOx},x_t,x_{t-1},w,\beta_{NOx})$ is found using Bayesian Disturbance Rejection algorithm given a training dataset $D_{NOx}$. The distribution is given by:

$$p(\tau_{t+1,NOx}|D_{NOx},x_t,x_{t-1},w,\beta_{NOx}) = \mathcal{N}(\tau_{t+1}|y(x_t,x_{t-1},d_{t,NOx},k_{NOx}^*,w_{MAP,NOx}), \sigma_{NOx}^2(x_t,x_{t-1},d_{t-1,NOx},k_{NOx}^*,w_{MAP,NOx})) \quad \text{Equation 122}$$

where $y(x_t,x_{t-1},d_{t,NOx},w_{MAP,NOx})$ is given by Equation 116 and $\sigma_{NOx}^2(x_t,x_{t-1},d_{t,NOx},w_{MAP,NOx})$ is given by:

$$\sigma_{NOx}^2(x_t,x_{t-1},d_{t,NOx},k_{NOx}^*,w_{MAP}) = \beta_{NOx}^{-1} + g_{t+1,NOx}^T A_{NOx}^{-1} g_{t+1,NOx} \quad \text{Equation 123}$$

where $A_{NOx}$ is the second derivative of the output with respect to the weights and is given by:

$$A_{NOx} = \text{Diag}(\alpha_{NOx})I + \beta_{NOx} H_{NOx} \quad \text{Equation 124}$$

where the R-propagation algorithm given above can be used to compute the Hessian, H. The vector, $g_{t+1}$, is defined as:

$$g_{t+1,NOx} = \left.\frac{\partial y(x_t, x_{t-1}, d_{t,NOx}, k_{NOx}^*, w)}{\partial w}\right|_{w=w_{MAP,NOx}} \quad \text{Equation 125}$$

Since the only set of variables that will be optimized using the optimizer are the inputs at time (t), the mean and variance of Equation 123 may be written as:

$$y_{MAP,NOx}(x_t) = y(x_t,x_{t-1},d_{t,NOx},k_{NOx}^*,w_{MAP,NOx}) \quad \text{Equation 126}$$

and:

$$\sigma_{MAP,NOx}^2(x_t) = \sigma_{NOx}^2(x_t,x_{t-1},d_{t,NOx},k_{NOx}^*,w_{MAP}) \quad \text{Equation 127}$$

Thus, the distribution for NOx is conveniently given by:

$$p(\tau_{t+1,NOx}|D_{NOx},x_t,x_{t-1},w,\beta_{NOx}) = \mathcal{N}(\tau_{t+1}|y_{MAP,NOx}(x_t),\sigma_{MAP,NOx}^2(x_t)) \quad \text{Equation 128}$$

Similarly, the distribution for CO is given by:

$$p(\tau_{t+1,CO}|D_{CO},x_t,x_{t-1},w,\beta_{CO}) = \mathcal{N}(\tau_{t+1}|y_{MAP,CO}(x_t),\sigma_{MAP,CO}^2(x_t)) \quad \text{Equation 129}$$

Once again, it may be desirous to minimize the NOx, maintain the CO below a certain level, minimize the change in the inputs and maintain the inputs in a bounded region. The cost function is used to express the desire to minimize the NOx, maintain the CO below a certain level, and minimize the change in the inputs. The constraints are used to maintain the inputs in a bounded region. Again, the optimization problem is defined by a cost function and constraints. The cost function can be defined as the following:

$$J(x_t) = \frac{\pi_1}{2} \int_{-\infty}^{\infty} \tau_{t+1,NOx}^2$$

Equation 130

$$p(\tau_{t+1,NOx} | D_{NOx}, x_t, x_{t-1}, w, \beta_{NOx}) d\tau_{t+1,NOx} +$$

$$\pi_2 \int_{-\infty}^{\infty} se^{\frac{(\tau_{t+1,CO}-b_{co})}{s}} p(\tau_{t+1,NOx} | D_{NOx}, x_t, x_{t-1}, w, \beta_{NOx})$$

$$d\tau_{t+1,CO} + \frac{\pi_3}{2}(x_t - x_{t-1})^T(x_t - x_{t-1})$$

The constraints are implement by the following bounds on the inputs:

$$b_{x_-} \leq x_t \leq b_{x_+}$$

Equation 131

As will be appreciated, the cost function and bound constraints are the same as those defined in Equation 118 and Equation 119 except for the first two terms of Equation 130 are the integral of the penalty over the distribution of the output. Substituting the normal distribution of Equation 128 and Equation 129 into the cost function of Equation 130, the following is shown:

$$J(x_t) =$$

Equation 132

$$\frac{\pi_1}{2} \int_{-\infty}^{\infty} \tau_{t+1,NOx}^2 \frac{1}{\sqrt{2\pi\sigma_{MAP,NOx}^2(x_t)}} e^{\frac{-(\tau_t - y_{MAP,NOx}(x_t))^2}{2\sigma_{MAP,NOx}^2(x_t)}}$$

$$d\tau_{t+1,NOx} + \pi_2 \int_{-\infty}^{\infty} se^{\frac{(\tau_{t+1,CO}-b_{co})}{s}}$$

$$\frac{1}{\sqrt{2\pi\sigma_{MAP,CO}^2(x_t)}} e^{\frac{-(\tau_t - y_{MAP,CO}(x_t))^2}{2\sigma_{MAP,CO}^2(x_t)}} d\tau_{t+1,CO} +$$

$$\frac{\pi_3}{2}(x_t - x_{t-1})^T(x_t - x_{t-1})$$

An analytic solution to the cost function and the derivative of the function are not known. For this reason, an approximation to the cost function is used:

$$J(x_t) \approx$$

Equation 132

$$\frac{\pi_1}{2} \sum_{i=-\infty}^{\infty} (i\Delta)^2 \frac{1}{\sqrt{2\pi\sigma_{MAP,NOx}^2(x_t)}} e^{\frac{-(i\Delta - y_{MAP,NOx}(x_t))^2}{2\sigma_{MAP,NOx}^2(x_t)}} \Delta + \pi_2$$

$$\sum_{i=-\infty}^{\infty} se^{\frac{(i\Delta - b_{co})}{s}} \frac{1}{\sqrt{2\pi\sigma_{MAP,CO}^2(x_t)}} e^{\frac{-(i\Delta - y_{MAP,CO}(x_t))^2}{2\sigma_{MAP,CO}^2(x_t)}} \Delta +$$

$$\frac{\pi_3}{2}(x_t - x_{t-1})^T(x_t - x_{t-1})$$

where the sum is equal to the integral as $\Delta$ goes to zero. To practically compute the summation, appropriate bounds for the summations and for $\Delta$ in the equation above must be selected. Because the normal distribution is essentially 0 three standard deviation from the mean, it is required only to sum around the mean value of the distribution within three standard deviations. Furthermore, the values for $\Delta$ in each of sums in the equation above can be defined based upon the standard deviations of the distribution. For this reason, $\Delta_{NOx}$ may be selected to be:

$$\Delta_{NOx} = \frac{6\sigma_{MAP,NOx}(x_t)}{1000}$$

Equation 134

Similar $\Delta_{CO}$ can be defined for the CO variable. Given $\Delta_{NOx}$ and $\Delta_{CO}$, Equation 133 may be reasonably approximate by:

$$J(x_t) \approx \frac{\pi_1}{2} \sum_{i=-500}^{500} (i\Delta_{NOx} + y_{MAP,NOx}(x_t))^2$$

Equation 135

$$\frac{1}{\sqrt{2\pi\sigma_{MAP,NOx}^2(x_t)}} e^{\frac{-(i\Delta_{NOx})^2}{2\sigma_{MAP,NOx}^2(x_t)}} \Delta_{NOx} +$$

$$\frac{\pi_2}{2} \sum_{i=-500}^{500} se^{\frac{(i\Delta_{CO} + y_{MAP,CO}(x_t) - b_{co})}{s}} \frac{1}{\sqrt{2\pi\sigma_{MAP,CO}^2(x_t)}}$$

$$e^{\frac{-(i\Delta_{CO})^2}{2\sigma_{MAP,CO}^2(x_t)}} \Delta_{CO} + \frac{\pi_3}{2}(x_t - x_{t-1})^T(x_t - x_{t-1})$$

As will be appreciated, the equation above provides a reasonable and practical approach to computing the cost function in real time. To solve for the gradient of the cost function with respect to the inputs at time (t), it is necessary to use an approximation. The easiest way to approximate the gradient is to use numerical differential. However, this approach is not computation efficient and a better approach is sought.

Alternatively, it is observed that the mean values used in the equation above for the cost function are significantly more affected by changes in the inputs than the variances. Thus, it is a reasonable approximation to assume the variances in the equation above are not affected by changes in the input. Assuming constant variances for $\sigma_{MAP,NOx}^2(x_t)$ and $\sigma_{MAP,CO}^2(x_t)$, the gradient of the cost function with respect to the inputs is approximated by:

$$\frac{\partial J(x_t)}{\partial x_t} \approx$$

Equation 136

$$\pi_1 \sum_{i=-500}^{500} (i\Delta_{NOx} + y_{MAP,NOx}(x_t)) \frac{e^{\frac{-(i\Delta_{NOx})^2}{2\sigma_{MAP,NOx}^2(x_t)}}}{\sqrt{2\pi\sigma_{MAP,NOx}^2(x_t)}} \Delta_{NOx}$$

$$\frac{\partial y_{MAP,NOx}(x_t)}{\partial x_t} +$$

$$\pi_2 \sum_{i=-500}^{500} e^{\frac{(i\Delta_{CO} + y_{MAP,CO}(x_t) - b_{co})}{s}} \frac{e^{\frac{-(i\Delta_{CO})^2}{2\sigma_{MAP,CO}^2(x_t)}}}{\sqrt{2\pi\sigma_{MAP,CO}^2(x_t)}}$$

$$\Delta_{CO} \frac{\partial y_{MAP,CO}(x_t)}{\partial x_t} + \frac{\pi_3}{2}(x_t - x_{t-1})$$

Using Equation 116 and Equation 117, it is found that:

$$\frac{\partial J(x_t)}{\partial x_t} \approx$$

Equation 137

-continued $$\pi_1 \sum_{i=-500}^{500} (i\Delta_{NOx} + y_{MAP,NOx}(x_t)) \frac{e^{\frac{-(i\Delta_{NOx})^2}{2\sigma^2_{MAP,NOx}(x_t)}}}{\sqrt{2\pi\sigma^2_{MAP,NOx}(x_t)}} \Delta_{NOx}$$

$$\frac{\partial NN(x_t, w_{MAP,NOx})}{\partial x_t} +$$

$$\pi_2 \sum_{i=-500}^{500} \frac{e^{\frac{(i\Delta_{CO}+y_{MAP,CO}(x_t)-b_{CO})}{s}} e^{\frac{-(i\Delta_{CO})^2}{2\sigma^2_{MAP,CO}(x_t)}}}{\sqrt{2\pi\sigma^2_{MAP,CO}(x_t)}}$$

$$\Delta_{CO} \frac{\partial NN(x_t, w_{MAP,CO})}{\partial x_t} + \frac{\pi_3}{2}(x_t - x_{t-1})$$

It should be noticed that the form of the previous equation is very similar to the deterministic cost function of Equation 121. Like Equation 121, the derivative of the first term in the equation above can be computed by backpropagating the value:

$$(i\Delta_{NOx} + y_{MAP,NOx}(x_t)) \frac{\pi_1}{\sqrt{2\pi\sigma^2_{MAP,NOx}(x_t)}} e^{\frac{-(i\Delta_{NOx})^2}{2\sigma^2_{MAP,NOx}(x_t)}} \Delta_{NOx}$$

through the NOx neural network $NN(x_t, w_{MAP,NOx})$ to the inputs. Likewise, the second term can be computed by backpropagating the value:

$$\frac{\pi_2 e^{\frac{(i\Delta_{CO}+y_{MAP,CO}(x_t)-b_{CO})}{s}}}{\sqrt{2\pi\sigma^2_{MAP,CO}(x_t)}} e^{\frac{-(i\Delta_{CO})^2}{2\sigma^2_{MAP,CO}(x_t)}} \Delta_{CO}$$

through the CO neural network $NN(x_t, w_{MAP,CO})$ to the inputs. Thus, an efficient algorithm is available for the computation of both the cost function and the derivative of the cost function. Using these algorithms, a gradient based approach with bounded values is used to solve to the optimization problem with a probabilistic model. The resulting optimized input vector can be output to the DCS and subsequently used to control the plant to minimize NOx while maintaining CO below a threshold.

The above optimization problem shows one embodiment of the invention. However, there are many different approaches that could be used to include a probabilistic model in the optimization problem. In addition, the overall model confidence calculation and the confidence calculation per input could be included in an optimization problem. For example, in Equation 133, the overall model confidence of the NOx model could be multiplied by the first term and the overall model confidence of the CO model could be multiplied by the second term in the cost function. Thus, the model confidence could be used to adjust the cost function to emphasize components with more confident (accurate) models.

Optimization and Automatically Updated Models

The preferred embodiment of the invention is to use the training algorithm in FIG. 8, limited to 3 cycles through the main loop, to train the neural network models of NOx and CO. Once the models are trained, they are used in an optimization system shown in FIG. 2 with the optimization problem defined as given by Equation 131 and Equation 135. (The goal of the optimization problem is to reduce NOx, keep CO below a specified bound, minimize the MV movement and maintain the MVs with a set of bounds. The optimization problem is solved every 15 minutes using a NLP solver. The resulting optimized MVs are output to the DCS and held constant until the next optimization cycle.

In the preferred embodiment, the models are retrained once a day using the algorithm shown in FIG. 11. When data is collected, the optimizer is turned off, and the Design of Experiments with selected inputs is used to collect the data. Once the additional data is collected, the model is retrained and the optimizer is turned back on using the updated models. It should be noted that if during data collection it is found that the MVs or CVs go beyond user specified bounds or the unit no longer is held at a steady load, the data collection can be discontinued and the optimizer may be re-enabled. Once the MVs or CVs are within bounds and the unit is at a steady load, the data collection can be re-enabled and the optimizer disabled until data collection is completed. Thus, the preferred embodiment uses Bayesian Disturbance Rejection models that are updated on-line in the optimization problem.

The preferred embodiment described above is used to control a set of MVs to reduce NOx emissions from a coal-fired power plant while maintaining CO below a limit. It should be noted that alternate embodiments of this invention exist for use in a power generation plant. For example, the invention may be used to optimize the removal of soot in a boiler by controlling the time and execution of sootblowers. The Bayesian Disturbance Rejection algorithm may be used to train models that predict the effects of sootblower activations (MVs) on heating surface cleanliness, temperature changes and heat duties. Given models of the effect of sootblower activations, an optimization problem could be created that is used to maximize the cleaning effects while observing constraints on the blower activations. Thus, the invention could be used for sootblower optimization at a power generation unit.

As will be appreciated, the invention described herein may be useful in applications beyond the power generation industry. For example, and without limitation, the invention may be used in the following industries: refining, chemicals, pulp and paper, pharmaceuticals, mining and manufacturing, and the food industries.

Yet another embodiment of the current invention includes its use for dynamic optimization rather than steady state optimization. Dynamic optimization is described in detail in S. Piche, B. Sayyar-Rodsari, D. Johnson and M. Gerules, "Nonlinear model predictive control using neural networks," *IEEE Control Systems Magazine*, vol. 20, no. 2, pp. 53-62, 2000, which is fully incorporated herein by reference. As will be appreciated, dynamic optimization relies on the use of a dynamic model. In Equation 1, the model is defined as:

$$m_t = NN(x_{t-1}, w) \qquad \text{Equation 138}$$

Alternatively, the model could be defined as:

$$m_t = NN(x_{t-1}, w^1) + NN(x_{t-2}, w^2) + \ldots + NN(x_{t-M}, w^M) \qquad \text{Equation 139}$$

where M is the number of neural network models. If the sample period of the model of the equation above is significantly less than the steady state response period, typically $\frac{1}{10}^{th}$ of the steady state response, this type of model forms a finite impulse response model and can be used to predict dynamics of the process. By extension, a Bayesian Disturbance Rejection algorithm can be used for training the M models of the previous equation. Once trained, these models could be used in a multi-step ahead optimization scheme. Thus, the neural model could be used for trajectory based model optimization. For example, models could be used to predict over the horizon from time (t+1) to t+M and then the inputs could be optimized over the horizon from (t) to t+M−1 given the appropriate cost function and constraints. In the preferred embodiment, the case was shown where M=1, but all results and conclusions provided here can be extended to cases where M>1.

A neural network based model is used in the preferred embodiment for $m_r$. According to other possible embodiments, other empirical model forms may be used including, for example, a linear model, polynomial curve fit, a least squares support vector machine, a support vector machine, and kernel methods including Gaussian Processes.

Thus, exemplary embodiments of the present invention include a method and/or system for training a disturbance rejection model that is configured to model an operation of a system so to calculate a predicted value for a system output at a future time. The disturbance rejection model may include a network for mapping system inputs to the system output, the network including a weight vector and a feedback coefficient. The method may include the steps of: obtaining a training dataset, the training dataset including a time series dataset of actual values for the system inputs and the system output as determined from measurements taken of the operation of the system during a historical operating period and training the disturbance rejection model pursuant to the training dataset. The training may include calculating updated values for each of the weight vector and the feedback coefficient of the network by minimizing an error function that include a first hyperparameter and a second hyperparameter. The first hyperparameter may include a vector for penalizing the weight vector and the second hyperparameter may include a scalar.

As described, the disturbance rejection model may include a disturbance rejection configuration in which the predicted value made by the disturbance rejection model for the system output at the future time is based upon: a predicted value made by the network for the system output at the future time and a value of a bias, the bias being based upon the feedback coefficient and an error. The bias may include the error multiplied by the feedback coefficient, The error includes a difference between: a predicted value made by the neural network of the system output at the previous time and an actual value of the system output at the previous time, The actual value is based upon a measurement taken by a sensor disposed in the system for measuring an operating parameter that relates to the system output.

Further, the network may be a neural network that includes multiple layers having nodes, the multiple layers including at least an input layer, an output layer, one or more hidden layers, and forward weight matrixes. The input layer may include a plurality of the nodes, the plurality of the nodes corresponding respectively to the system inputs. Each of the plurality of the nodes may be configured to receive an input signal relating to a value for a particular system input. The output layer may include at least one of the nodes, which corresponds to the system output. The one or more hidden layers may be disposed between the input layer and the output layer, each of the one or more hidden layers including a plurality of the nodes. The forward weight matrices may include connectors that connect the nodes of successive layers of the multiple layers of the neural network and a weight value for each of the connectors. The weight vector may define the weight values for the connectors of the forward weight matrices.

The training dataset may be generated via a design of experiment process. The design of experiment process may include the manipulated variables being moved independently such that moves resulting therefrom are uncorrelated over time. The training dataset may include T samples, the T samples taken at times=[1, 2, ..., t, ..., T], wherein time (t), time (t−1), time (t−2) denote generalized samples within the training dataset, where the time (t−2) occurs just prior to the time (t−1) and the time (t−1) occurs just prior to the time (t).

The system be a power generating unit that includes at least a steam turbine operably connected to a boiler. The system output may include a controlled variable, and the system inputs may include manipulated variables and disturbance variables. The manipulated variables may include any of the following: an over-fired air damper position, a tilt bias, a yaw bias, a secondary air damper position bias, a fuel mill speed bias, a primary air bias, an O2 bias, and a master burner tilt. The controlled variable may include an emission level for the power generating unit.

The training may include: a first step that is defined as the calculating of the updated values for the weight vector and the feedback coefficient by minimizing the error function; and a second step that may include calculating updated values for the first hyperparameter and the second hyperparameter based upon the updated values that are calculated in the first step for the weight vector and the feedback coefficient. The computing the updated values for each of the weight vector and the feedback coefficient may include a matrix version of the disturbance rejection model. The step of computing the updated values for the weight vector and the feedback coefficient that minimize the error function may include a first iterative process, each iteration thereof being inclusive of the following steps: using forward propagation to compute the vector y using the matrix version of the disturbance rejection model; using backward propagation on the disturbance rejection model to compute a derivative of the error function with respect to the weight vector and the feedback coefficient; and using a gradient based algorithm to compute a current iteration value for the weight vector while constraining a current iteration value of the feedback coefficient to values between 0.0 and 1.0. The gradient based algorithm may include a steepest descent algorithm.

The first iterative process for computing the updated values for the weight vector and the feedback coefficient may continue until an ultimate iteration is found that results in a change in the value of the error function from a preceding iteration to be less than a predefined threshold. The current iteration value for each of the weight vector and the feedback coefficient found in the ultimate iteration may be deemed to be the values of the weight vector and the feedback coefficient that minimize the error function and, thus, are designated as the updated values for the weight vector and the feedback coefficient.

The step of calculating the re-estimated value for the first hyperparameter and the second hyperparameter may include a second iterative process. A single iteration of the second iterative process may include the steps of: calculating of the updated values for the weight vector and the feedback coefficient given the re-estimated values of the first hyperparameter and the second hyperparameter as calculated in an iteration of the second iterative process that is previous to the single iteration; and calculating the re-estimated value for each of the first hyperparameter and the second hyperparameter given the updated values for the weight vector and the feedback coefficient as calculated within the single iteration. The second iterative process of the disturbance rejection training algorithm may continue until the re-estimated value for each of the first hyperparameter and the second hyperparameter converges to a value.

The present invention further describes a related system that includes a power generating unit and a control system operably connected to the power generating unit for controlling an operation thereof. The control system may include: a hardware processor; and a machine readable storage medium on which is stored the disturbance rejection model and instructions that cause the hardware processor to execute a process related to control of the power generating unit. The process may include: obtaining a training dataset; and training the disturbance rejection model pursuant to the training dataset. The training may include calculating updated values for each of the weight vector and the feedback coefficient of the neural network by minimizing an error function that includes a first hyperparameter and a second hyperparameter. The first hyperparameter may include a vector for penalizing the weight vector and the second hyperparameter may include a scalar.

According to another related exemplary embodiment, the present invention further describes a method for controlling an operation of a system that includes a disturbance rejection model that is configured for modeling the operation of the system so to generate a predicted value for a system output at a future time. The disturbance rejection model may include a neural network for mapping system inputs to the system output. The method may include the steps of: calculating a probabilistic distribution for the predicted value of the system output at the future time, where the calculating of the probabilistic distribution includes a Bayesian evidence framework without sampling; and controlling the operation of the system per the calculated probabilistic distribution.

The calculating of the probabilistic distribution may include calculating a mean ($\mu$) and a variance ($\sigma^2$) of a normal distribution (N). The mean ($\mu$) may correspond to the predicted value made by the trained disturbance rejection model for the system output at the future time. The variance ($\sigma^2$) may depend, at least in part, on a value of an inverse of the second hyperparameter.

The controlling the operation of the system may include optimizing the operation of the system. The system may include a power generating unit that includes at least a steam turbine operably connected to a boiler. The manipulated variables may include any of the following: an over-fired air damper position, a tilt bias, a yaw bias, a secondary air damper position bias, a fuel mill speed bias, a primary air bias, an O2 bias, a master burner tilt, a corner burner bias, and a windbox to furnace differential pressure bias. The controlled variable may include: an emission level for the power generating unit; a heat rate for the power generating unit; or a boiler efficiency for the power generating unit. Alternatively, the controlled variable may include at least one of: a reheat temperature level for the power generating unit; a superheat steam temperature level for the power generating unit; a reheat spray level for the power generating unit; and a superheat steam spray level for the power generating unit. The boiler may include a heat transfer device. In such cases, the manipulated variables may include a cumulative time since a last activation of a first or second soot blower. The controlled variable may also include one of the following aspects associated with the heat transfer device: a cleanliness factor; a heat transfer coefficient; and a heat duty. The controlled variable may also include a steam inlet and output temperature differential associated with a heat transfer device in the boiler of the power generating unit.

The optimizing the operation of the system may include the steps of: determining one or more operating goals associated with the operation of the power generating unit; determining one or more operating constraints associated with the operation of the power generating unit; and providing the one or more operating goals and the one or more operating constraints to an optimization system. The optimization system may include: the disturbance rejection model; an optimizer for determining optimal setpoint values for the manipulated variables associated with the control of the power generating unit, the optimal setpoint values determined in accordance with the one or more operating goals and the one or more operating constraints; and a communication link to a control system for communicating the optimal setpoint values thereto. The control system may be configured to provide closed-loop control for the operation of the power generating unit. The optimizing may further include the steps of: using the optimization system and the probabilistic distribution for the predicted value of the system output at the future time as calculated by the disturbance rejection model to calculate the optimal setpoint values for operating the power generating unit; and communicating via the communication link the optimal setpoint values to the control system of the power generating unit. The optimizer of the optimization system may be selected from a group consisting of: linear programming, quadratic programming, mixed integer non-linear programming, stochastic programming, global non-linear programming, genetic algorithms, and particle/swarm techniques.

The method may further include the step of receiving a cost function that defines costs associated with each of the one or more operating goals and the one or more operating constraints. The optimizer of the optimization system may be configured to determine the optimal setpoint values for the manipulated variables by accessing the disturbance rejection model to minimize the cost function. The method may further include instructing the control system to control the power generating unit in accordance with the optimal setpoints once the optimal setpoints are communicated thereto. At least one of the costs defined within the cost function may be configured to vary according to a value of an operating goal probability. The operating goal probability may define a probability as to whether a selected one of the one or more operating goals will be satisfied at the future time. The goal probability may be derived from the probabilistic distribution for the predicted value of the system output at the future time. The operating goals may include any of the following: an output level for the power generating unit; and a heat rate for the power generating unit. At least one of the costs defined within the cost function may be configured to vary according to a value of an operating constraint probability. The operating constraint probability may define a probability as to whether a selected one of the one or more operating constraints is violated. The operating constraint probability may be derived from the probabilistic distribution for the predicted value of the system output at the future time. The operating constraints may include any of the following: a limit on emissions of NOx a limit on emissions of SO2 a limit on emissions of CO2 and a limit on emissions of CO. The cost function may include a mathematical representation for evaluating the operation of the power generating unit relative to the one or more operating goals and the one or more operating constraints. The expression of the one or more operating goals in the cost function may include coefficients for establishing a relative weighting therebetween.

Another exemplary embodiment of the present invention includes a method for modeling an operation of a system that may include a disturbance rejection model that is configured to generate a predicted value for a system output at a future time. The disturbance rejection model may include a neural network for mapping system inputs to the system output. The method may include the steps of: training the disturbance rejection model per a training dataset; and calculating a confidence metric for the disturbance rejection model. As described herein, the confidence metric is configured to indicate a probability that a predicted sign of a gain in the system output at the future time made by the disturbance rejection model is correct. The confidence metric may be based on the probabilistic distribution discussed above.

The algorithm for calculating the confidence metric may be configured such that the confidence metric may include: a high probability that the predicted sign of the gain in the system output at the time (t) is correct when the variance of the probabilistic distribution is small compared to a difference between: the predicted value of the system output made by the trained disturbance rejection model at the time (t) and the system output (d_(t−1)) at the time (t−1); and a low probability that the predicted sign of the gain in the system output at the time (t) is correct when the variance of the probabilistic distribution is large compared to the difference between: the predicted value of the system output made by the trained disturbance rejection model at the time (t) and the system output (d_(t−1)) at the time (t−1).

The predicted sign of the gain in the system output is defined as a predicted sign of a value change for the system output between the time (t−1) and the time (t). The predicted sign may include: a positive value when the value change results in the predicted value for the system output at the time (t) increasing from the actual value of the system output (d_(t−1)) at the time (t−1); and a negative value when the value change results in the predicted value for the system output at the time (t) decreasing from the actual value of the system output (d_(t−1)) at the time (t−1).

The calculation of a confidence score based on the confidence metric for the disturbance rejection model may include: calculating the confidence metric for selected samples chosen from the T samples of the training dataset; calculating an average value for the confidence metric for the selected samples; and designating the calculated average value as the confidence score for the disturbance rejection model. The confidence score may include a percentage indicating a likelihood that the predicted sign of the gain in the system output at the future time made by the disturbance rejection model is correct based upon the performance of a whole of the disturbance rejection model over the selected samples from the training dataset. The future time may include a time that is subsequent to the historical operating period on which the training dataset is based. The confidence score may include a spectrum within which: a value of 100% indicates that the disturbance rejection model predicts the correct sign of the gain for 100% of the samples within the selected samples from the training dataset; and a value of 50% indicates that the disturbance rejection model has no confidence in predicting the correct sign of the gain for the selected samples from the training dataset.

The method may further include the step of recommending a modification to the disturbance rejection model based upon a comparison of the confidence score to a predetermined minimum threshold. The modification may relate to a need for augmenting the training dataset of the disturbance rejection model with additional data when the confidence score fails to satisfy the predetermined minimum threshold.

A related exemplary embodiment includes a method for modeling a system, the method including a disturbance rejection model configured for modeling an operation of the system so to generate a predicted value for a system output at a future time. The disturbance rejection model may include a neural network for mapping system inputs to the system output and input-output pairings, each of which represent a unique pairing of one of the system inputs with the system output. The method may include the steps of: calculating a confidence metric for a selected one of the input-output pairings of the disturbance rejection model; and recommending a modification be made to the disturbance rejection model based upon the confidence metric calculated for the selected one of the input-output pairing. The confidence metric may be configured to indicate a probability that a predicted sign of a gain in the system output at the future time made by the disturbance rejection model is correct when the system input of the selected one of the input-output pairings is varied.

In accordance with the present example, adjacent samples within the T samples of the training dataset are defined as paired samples that correspond to consecutively occurring times within the times=[1, 2, . . . , t, . . . , T]. Pertaining to the training dataset, a move is defined as a change to a system input setting that occurs between the consecutively occurring times of one of the adjacent samples. The training dataset may be configured such that each of the adjacent samples defined within the training dataset include no more than one of the moves. Alternatively, the training dataset may be configured such that most of the adjacent samples defined within the training dataset include more than one of the moves.

The confidence metric may be used to calculate a confidence score for the selected one of the input-output pairings. The calculation of the confidence score may include: determining a subset of samples from the T samples of the training dataset, the subset of samples may include only those adjacent samples in which the move involves the selected one of the input-output pairings; calculating the confidence metric for each of the samples within the subset of samples; calculating an average value for the confidence metric for the subset of samples; and designating the average value as the confidence score for the selected one of the input-output pairings. The confidence score determined for the selected one of the input-output pairings may be compared to a predetermined threshold. The recommended modification for the disturbance rejection model may be based on the comparison of the confidence score to the predetermined threshold. The recommended modification may relate to whether additional data should be obtained for the training dataset. The predetermined threshold may include a minimum threshold. The recommended modification for the disturbance rejection model may include at least one of the following: when the comparison shows that the confidence score fails to satisfy the minimum threshold, the recommended modification may include one regarding a high need for obtaining the additional data for training dataset; and when the comparison shows that the confidence score satisfies the minimum threshold, the recommended modification may include one regarding a low need for obtaining the additional data for training dataset. The recommended modification for the disturbance rejection model may include defining the additional data as data corresponding to the system input of the selected one of the input-output pairings.

The calculation of the confidence score may be repeated for at least one other of the input-output pairings such that the confidence score is determined for two or more of the input-output pairings. The confidence scores determined for the two or more of the input-output pairings are each compared against a predetermined threshold. The recommended modification for the disturbance rejection model may include one related to a need to obtain additional data for the training dataset based upon how each of the confidence scores compared to the predetermined threshold. Alternatively, the confidence scores determined for the two or more of the input-output pairings may be compared against each other so to determine at least a first input-output pairing that has a confidence score that is preferable compared to a second input-output pairing. The recommended modification for the disturbance rejection model may include one in which the need to obtain the additional data for the system input of the second input-output pairing is prioritized over the need to gather additional data for the system input of the first input-output pairing.

As one of ordinary skill in the art will appreciate, the many varying features and configurations described above in relation to the several exemplary embodiments may be further selectively applied to form the other possible embodiments of the present invention. For the sake of brevity and taking into account the abilities of one of ordinary skill in the art, all of the possible iterations is not provided or discussed in detail, though all combinations and possible embodiments embraced by the several claims below or otherwise are intended to be part of the instant application. In addition, from the above description of several exemplary embodiments of the invention, those skilled in the art will perceive improvements, changes and modifications. Such improvements, changes and modifications within the skill of the art are also intended to be covered by the appended claims. Further, it should be apparent that the foregoing relates only to the described embodiments of the present application and that numerous changes and modifications may be made herein without departing from the spirit and scope of the application as defined by the following claims and the equivalents thereof.

That which is claimed:

1. A method for training a disturbance rejection model that is configured to model an operation of a system so to calculate a predicted value for a system output at a future time, wherein the disturbance rejection model comprises a network for mapping system inputs to the system output, the network comprising a weight vector and a feedback coefficient, the method comprising the steps of:
    obtaining a training dataset, the training dataset comprising a time series dataset of actual values for the system inputs and the system output as determined from measurements taken of the operation of the system during a historical operating period; and
    training the disturbance rejection model pursuant to the training dataset;
wherein:
    the training comprises calculating updated values for each of the weight vector and the feedback coefficient of the network by minimizing an error function that includes a first hyperparameter and a second hyperparameter; and
    the first hyperparameter includes a vector for penalizing the weight vector and the second hyperparameter comprises a scalar;
wherein the disturbance rejection model comprises a disturbance rejection configuration in which the predicted value made by the disturbance rejection model for the system output at the future time is based upon: a predicted value made by the network for the system output at the future time; and a value of a bias, the bias being based upon the feedback coefficient and an error;
wherein the network comprises a neural network that includes multiple layers having nodes, the multiple layers including at least an input layer, an output layer, one or more hidden layers, and forward weight matrixes; and
wherein:
    the input layer comprises a plurality of the nodes, the plurality of the nodes corresponding respectively to the system inputs, wherein each of the plurality of the nodes is configured to receive an input signal relating to a value for a particular one of the system inputs;
    the output layer comprises at least one of the nodes, the at least one of the nodes corresponding to the system output;
    the one or more hidden layers are disposed between the input layer and the output layer, each of the one or more hidden layers comprising a plurality of the nodes; and
    the forward weight matrices comprise connectors that connect the nodes of successive layers of the multiple layers of the neural network and a weight value for each of the connectors;
wherein the weight vector defines the weight values for the connectors of the forward weight matrices.

2. The method of claim 1, wherein the bias comprises the error multiplied by the feedback coefficient, wherein the error comprises a difference between:
    a predicted value made by the neural network of the system output at the previous time; and
    an actual value of the system output at the previous time, wherein the actual value is based upon a measurement taken by a sensor disposed in the system for measuring an operating parameter that relates to the system output; and
wherein the system output comprises a controlled variable, and the system inputs comprise manipulated variables and disturbance variables, wherein:
    the manipulated variables are defined as variables that a system operator is able to manipulate to affect the controlled variable;
    the disturbance variables are defined as variables that affect the controlled variable that the system operator is unable to manipulate.

3. The method of claim 2, wherein the training dataset is generated via a design of experiment process, wherein the design of experiment process includes the manipulated variables being moved independently such that moves resulting therefrom are uncorrelated over time;
    wherein the system comprises a power generating unit, the power generating unit comprising at least a steam turbine operably connected to a boiler;
    wherein the manipulated variables comprise two or more of the following: an over-fired air damper position, a tilt bias, a yaw bias, a secondary air damper position bias, a fuel mill speed bias, a primary air bias, an $O_2$ bias, and a master burner tilt; and
    wherein the controlled variable comprises an emission level for the power generating unit.

4. The method of claim 3, wherein the training comprises:
a first step that is defined as the calculating of the updated values for the weight vector and the feedback coefficient by minimizing the error function; and
a second step that comprises calculating updated values for the first hyperparameter and the second hyperparameter based upon the updated values that are calculated in the first step for the weight vector and the feedback coefficient.

5. The method of claim 4, wherein the training dataset comprises T samples, the T samples taken at times=[1, 2, ..., t, ..., T] wherein a time (t), a time (t−1), a time (t−2) denote generalized samples within the training dataset where the time (t−2) occurs just prior to the time (t−1) and the time (t−1) occurs just prior to the time (t);
wherein the disturbance rejection model comprises:

$$y_t = NN(x_{t-1}, w) + k(d_{t-1} - NN(x_{t-2}, w))$$

wherein:
the NN is the neural network;
the k comprises the feedback coefficient;
a vector $y = [y_1, y_2 \ldots y_t \ldots y_T]^T$ comprises predicted values of the system output by the model at the times within the training dataset;
a vector $x = [x_1\ x_2 \ldots x_t \ldots x_T]^T$ comprises an input vector of the system inputs at the times within the training dataset;
a vector $d = [d_1\ d_2 \ldots d_t \ldots d_T]^T$ comprises an output vector of the system output at the times within the training dataset;
the w comprises the weight vector of the neural network;
the $NN(x_{t-1}, w)$ comprises a predicted value of the neural network at the time (t) of the training dataset given the weight vector; and
the $NN(x_{t-2}, w)$ comprises a predicted value of the neural network at the time (t−1) of the training dataset given the weight vector.

6. The method of claim 5, wherein a vector $m = [m_1\ m_2 \ldots m_t \ldots m_T]^T$ comprises predicted values of the system output as made by the neural network at the times within the training dataset;
wherein, given the vector m, the disturbance rejection model comprises:

$$y_t = m_t + k(d_{t-1} - m_{t-1})$$

wherein an error vector, which is denoted as $\epsilon$ below, comprises a difference between the predicted values of the system output by the disturbance rejection model and the corresponding actual values of the system output at the times of the training dataset, wherein the error vector is given by:

$$\epsilon_t = y_t - d_t$$

7. The method of claim 6, wherein the computing the updated values for each of the weight vector and the feedback coefficient includes a matrix version of the disturbance rejection model in which:
a C matrix comprises a T by T matrix configured to represent a coupling between time series elements of the training dataset;
a K matrix comprises a T by T matrix configured to represent the feedback coefficient between coupled ones of the time series elements of the training dataset; and
a S matrix comprises a T by T matrix configured to represent a derivative of the K matrix with respect to the feedback coefficient.

8. The method of claim 7, wherein the error function, which is denoted as E below, that is minimized to calculate the updated values of the weight vector and the feedback coefficient is defined as:

$$E = \tfrac{1}{2} w^T (\text{Diag}(\alpha)) w + \tfrac{1}{2} \beta \epsilon^T C \epsilon$$

wherein:
the C comprises the C matrix;
the $\alpha$ comprises the first hyperparameter;
the $\beta$ comprises the second hyperparameter;
the $w^T$ comprises a transposition of the weight vector (w);
the $\text{Diag}(\alpha)$ comprises a matrix with a diagonal element equal to a value of a corresponding diagonal element of the vector of the first hyperparameter while all other values in the matrix of the $\text{Diag}(\alpha)$ are set to a value of 0;
the $\epsilon$ comprises the error vector; and
the $\epsilon^T$ comprises a transposition of the error vector.

9. The method of claim 8, further comprising the step of setting an initial value for each of: the vector of the first hyperparameter; the scalar of the second hyperparameter; the weight vector, and the feedback coefficient;
wherein the setting of the initial value for each of the vector of the first hyperparameter and the scalar of the second hyperparameter comprises setting each to a value of about 1;
wherein the setting the initial value of the weight vector comprises randomly generating the weight values thereof; and
wherein setting of the initial value for the feedback coefficient comprises setting the initial value to a value of about 1;
wherein the minimization of the error function is completed given: the training dataset; the initial value of the vector of the first hyperparameter; the initial value of the scalar of the second hyperparameter; the initial value of the weight vector; and the initial value of the feedback coefficient.

10. The method of claim 8, wherein the step of computing the updated values for the weight vector and the feedback coefficient that minimize the error function comprises a first iterative process, each iteration thereof being inclusive of the following steps:
using forward propagation to compute the vector y using the matrix version of the disturbance rejection model, as given by:

$$y = C(m + K(d - m));$$

using backward propagation on the disturbance rejection model to compute a derivative of the error function with respect to the weight vector and the feedback coefficient, as given by, respectively:

$$\frac{\partial E}{\partial w} = \text{Diag}(\alpha) w + \epsilon^T C (I - K) \frac{\partial m}{\partial w}$$

and $$\frac{\partial E}{\partial k} = -\epsilon'^T (I - K)^T C S \epsilon'$$

wherein:
the I comprises an identity matrix;
the $\epsilon'$ comprises a second error vector that is a difference between the predicted values of the system output by the neural network and the corresponding actual values of the system output at the times within the training dataset, as given by:

$\epsilon'_t = m_t - d_t$; and the $$\frac{\partial m}{\partial w}$$

comprises a derivative of one of the disturbance rejection model and the neural network found using the backward propagation; and using a gradient based algorithm to compute a current iteration value for the weight vector while constraining a current iteration value of the feedback coefficient to values between 0.0 and 1.0.

11. The method of claim 10, wherein the gradient based algorithm comprises a steepest descent algorithm; and wherein:
the C matrix is given by:

$$C = \begin{bmatrix} 0 & 0 & 0 & & 0 & 0 & 0 \\ 0 & 1 & 0 & \cdots & 0 & 0 & 0 \\ 0 & 0 & 1 & & 0 & 0 & 0 \\ \vdots & & & \ddots & & & \vdots \\ 0 & 0 & 0 & \cdots & 1 & 0 & 0 \\ 0 & 0 & 0 & & 0 & 1 & 0 \\ 0 & 0 & 0 & & 0 & 0 & 1 \end{bmatrix}$$

the S matrix is given by:

$$S = \begin{bmatrix} 0 & 0 & 0 & & 0 & 0 & 0 \\ 1 & 0 & 0 & \cdots & 0 & 0 & 0 \\ 0 & 1 & 0 & & 0 & 0 & 0 \\ \vdots & & & \ddots & & & \vdots \\ 0 & 0 & 0 & & 0 & 0 & 0 \\ 0 & 0 & 0 & \cdots & 1 & 0 & 0 \\ 0 & 0 & 0 & & 0 & 1 & 0 \end{bmatrix}$$

the K matrix is given by:

$K = kS$.

12. The method of claim 10, wherein the first iterative process for computing the updated values for the weight vector and the feedback coefficient continues until an ultimate iteration is found that results in a change in the value of the error function from a preceding iteration to be less than a predefined threshold; and
wherein the current iteration value for each of the weight vector and the feedback coefficient found in the ultimate iteration are deemed to be the values of the weight vector and the feedback coefficient that minimize the error function and, thus, are designated as the updated values for the weight vector and the feedback coefficient.

13. The method of claim 8, wherein the step of calculating the re-estimated value for the first hyperparameter and the second hyperparameter comprises a second iterative process, wherein a single iteration of the second iterative process includes the steps of:
calculating of the updated values for the weight vector and the feedback coefficient given the re-estimated values of the first hyperparameter and the second hyperparameter as calculated in an iteration of the second iterative process that is previous to the single iteration; and
calculating the re-estimated value for each of the first hyperparameter and the second hyperparameter given the updated values for the weight vector and the feedback coefficient as calculated within the single iteration.

14. The method of claim 13, wherein the second iterative process of the disturbance rejection training algorithm continues until the re-estimated value for each of the first hyperparameter and the second hyperparameter converges to a value;
wherein X is defined as the number of system inputs;
wherein the step of calculating the re-estimated value for the first hyperparameter comprises identifying X+3 elements of the first hyperparameter, wherein the X+3 elements include:
an X element, which includes hyperparameters related to weighting the system inputs;
a X+1 element, which includes a hyperparameter for a weighting a hidden unit bias;
a X+2 element, which includes a hyperparameter associated with a second layer of the weights; and
a X+3 element, which includes a hyperparameter for weighting an output bias.

15. The method of claim 14, wherein the step of calculating the re-estimated value for the first hyperparameter further includes:
denoting the X+3 elements of the first hyperparameter as a vector a;
identifying a $q_i$ vector for elements of the vector a, wherein a $q_{i,j}$ defines a $j^{th}$ element of the vector $q_i$ and comprises:
a value of 1.0 if an element a appears in the vector of the first hyperparameter at the $j^{th}$ element; and
a value of 0.0 if otherwise;
computing a complexity factor for independent values in the first hyperparameter using:

$$\gamma_i = \sum_{j=1}^{N} q_{i,j} - a_i(q_i(\text{diag}(H^{-1})))$$

wherein the $H^{-1}$ comprises an inverse of a Hessian matrix;
updating the vector a using:

$$a_i = \frac{\gamma_i}{(q_i \cdot w_{MAP})w_{MAP}^T}$$

using the elements of the updated vector a to update the X+3 elements of the vector of the first hyperparameter.

16. The method of claim 15, wherein the step of calculating the re-estimated value for the second hyperparameter comprises using:

$$\beta = \frac{N - \sum_{i=1}^{X+3} \gamma_i}{\epsilon^T C \epsilon}$$

where the N comprises a total number of weights in the weight vector of the neural network; and wherein the step of calculating the re-estimated value for each of the first hyperparameter and the second hyperparameter comprises a third iterative process that is repeated between 4 and 6 times.

17. A system comprising:
a power generating unit;
a control system operably connected to the power generating unit for controlling an operation thereof, the control system comprising:
 a hardware processor; and
 a machine readable storage medium on which is stored:
  a disturbance rejection model; and instructions that cause the hardware processor to execute a process related to control of the power generating unit;
wherein the disturbance rejection model is configured to model the operation of the power generating unit so to calculate a predicted value for an output of the power generating unit at a future time, the disturbance rejection model comprising a network for mapping inputs of the power generating unit to the output, wherein the network comprises a weight vector and a feedback coefficient, and wherein the disturbance rejection model comprises a disturbance rejection configuration;

wherein the process comprises:
 obtaining a training dataset, the training dataset comprising a time series dataset of actual values for the inputs and the output as determined from measurements taken of the operation of the power generating unit during a historical operating period; and
 training the disturbance rejection model pursuant to the training dataset;
wherein the training comprises calculating updated values for each of the weight vector and the feedback coefficient of the network by minimizing an error function that includes a first hyperparameter and a second hyperparameter;
wherein the first hyperparameter includes a vector for penalizing the weight vector and the second hyperparameter comprises a scalar;
wherein the disturbance rejection model comprises a disturbance rejection configuration in which the predicted value made by the disturbance rejection model for the output at the future time is based upon: a predicted value made by the network for the output at the future time; and a value of a bias, the bias being based upon the feedback coefficient and an error;
wherein the network comprises a neural network that includes multiple layers having nodes, the multiple layers including at least an input layer, an output layer, one or more hidden layers, and forward weight matrixes; and
wherein:
 the input layer comprises a plurality of the nodes, the plurality of the nodes corresponding respectively to the inputs, wherein each of the plurality of the nodes is configured to receive an input signal relating to a value for a particular one of the inputs;
 the output layer comprises at least one of the nodes, the at least one of the nodes corresponding to the output;
 the one or more hidden layers are disposed between the input layer and the output layer, each of the one or more hidden layers comprising a plurality of the nodes; and
 the forward weight matrices comprise connectors that connect the nodes of successive layers of the multiple layers of the neural network and a weight value for each of the connectors;
wherein the weight vector defines the weight values for the connectors of the forward weight matrices.

18. The system of claim 17, wherein the bias comprises the error multiplied by the feedback coefficient, wherein the error comprises a difference between:
 a predicted value made by the neural network of the output at the previous time; and
 an actual value of the output at the previous time, wherein the actual value is based upon a measurement taken by a sensor disposed in the power generating unit for measuring an operating parameter that relates to the output;
wherein the power generating unit comprising at least a steam turbine operably connected to a boiler;
wherein the output comprises a controlled variable, and the inputs comprise manipulated variables and disturbance variables, wherein:
 the manipulated variables comprise two or more of the following: an over-fired air damper position, a tilt bias, a yaw bias, a secondary air damper position bias, a fuel mill speed bias, a primary air bias, an $O_2$ bias, and a master burner tilt; and
 the controlled variable comprises an emission level for the power generating unit.

19. The system of claim 18, wherein the training the disturbance rejection model comprises:
 a first step that is defined as the calculating of the updated values for the weight vector and the feedback coefficient by minimizing the error function; and
 a second step that comprises calculating updated values for the first hyperparameter and the second hyperparameter based upon the updated values that are calculated in the first step for the weight vector and the feedback coefficient.

20. The system of claim 19, wherein the training dataset comprises T samples, the T samples taken at times=[1, 2, ..., t, ..., T] wherein a time (t), a time (t−1), a time (t−2) denote generalized samples within the training dataset where the time (t−2) occurs just prior to the time (t−1) and the time (t−1) occurs just prior to the time (t);
wherein the disturbance rejection model comprises:

$$y_t = NN(x_{t-1}, w) + k(d_{t-1} - NN(x_{t-2}, w))$$

wherein:
the NN is the neural network;
the k comprises the feedback coefficient;
a vector $y=[y_1\ y_2\ \ldots\ y_t\ \ldots\ y_T]^T$ comprises predicted values of the output by the model at the times within the training dataset;
a vector $x=[x_1\ x_2\ \ldots\ x_t\ \ldots\ x_T]^T$ comprises an input vector of the inputs at the times within the training dataset;
a vector $d=[d_1\ d_2\ \ldots\ d_t\ \ldots\ d_T]^T$ comprises an output vector of the output at the times within the training dataset;
the w comprises the weight vector of the neural network;
the $NN(x_{t-1}, w)$ comprises a predicted value of the neural network at the time (t) of the training dataset given the weight vector; and
the $NN(x_{t-2}, w)$ comprises a predicted value of the neural network at the time (t−1) of the training dataset given the weight vector.

21. The system of claim 20, wherein a vector $m=[m_1\ m_2\ \ldots\ m_t\ \ldots\ m_T]^T$ comprises predicted values of the output as made by the neural network at the times within the training dataset;

wherein, given the vector m, the disturbance rejection model comprises:

$$y_t = m_t + k(d_{t-1} - m_{t-1})$$

wherein an error vector, which is denoted as ϵ below, comprises a difference between the predicted values of the output by the disturbance rejection model and the corresponding actual values of the output at the times of the training dataset, wherein the error vector is given by:

$$\epsilon_t = y_t - d_t.$$

22. The system of claim 21, wherein the computing the updated values for each of the weight vector and the feedback coefficient includes a matrix version of the disturbance rejection model in which:
   a C matrix comprises a T by T matrix configured to represent a coupling between time series elements of the training dataset;
   a K matrix comprises a T by T matrix configured to represent the feedback coefficient between coupled ones of the time series elements of the training dataset; and
   a S matrix comprises a T by T matrix configured to represent a derivative of the K matrix with respect to the feedback coefficient.

23. The system of claim 22, wherein the error function, which is denoted as E below, that is minimized to calculate the updated values of the weight vector and the feedback coefficient is defined as:

$$E = \tfrac{1}{2} w^T (\text{Diag}(\alpha)) w + \tfrac{1}{2} \beta \epsilon^T C \epsilon$$

wherein:
   the C comprises the C matrix;
   the α comprises the first hyperparameter;
   the β comprises the second hyperparameter;
   the $w^T$ comprises a transposition of the weight vector (w);
   the Diag(α) comprises a matrix with a diagonal element equal to a value of a corresponding diagonal element of the vector of the first hyperparameter while all other values in the matrix of the Diag(α) are set to a value of 0;
   the ϵ comprises the error vector; and
   the $\epsilon^T$ comprises a transposition of the error vector.

24. The system of claim 23, wherein the computing the updated values for the weight vector and the feedback coefficient that minimize the error function comprises a first iterative process, each iteration thereof being inclusive of the following steps:
   using forward propagation to compute the vector y using the matrix version of the disturbance rejection model, as given by:

$$y = C(m + K(d - m));$$

using backward propagation on the disturbance rejection model to compute a derivative of the error function with respect to the weight vector and the feedback coefficient, as given by, respectively:

$$\frac{\partial E}{\partial w} = \text{Diag}(\alpha) w + \epsilon^T C (I - K) \frac{\partial m}{\partial w}$$

and $$\frac{\partial E}{\partial k} = -\epsilon'^T (I - K)^T C S \epsilon'$$

wherein:
   the I comprises an identity matrix;
   the ϵ' comprises a second error vector that is a difference between the predicted values of the output by the neural network and the corresponding actual values of the output at the times within the training dataset, as given by:

$$\epsilon'_t = m_t - d_t;\text{ and}$$

the $$\frac{\partial m}{\partial w}$$

comprises a derivative of one of the disturbance rejection model and the neural network found using the backward propagation; and
   using a gradient based algorithm to compute a current iteration value for the weight vector while constraining a current iteration value of the feedback coefficient to values between 0.0 and 1.0.

* * * * *